United States Patent
Zhang et al.

(10) Patent No.: US 11,895,060 B2
(45) Date of Patent: Feb. 6, 2024

(54) ENABLING TRANSITIONS BETWEEN HALF-DUPLEX AND FULL-DUPLEX MODES

(71) Applicant: QUALCOMM Incorporated, San Diego, CA (US)

(72) Inventors: Qian Zhang, Basking Ridge, NJ (US); Peter Gaal, San Diego, CA (US); Yan Zhou, San Diego, CA (US); Navid Abedini, Basking Ridge, NJ (US); Tao Luo, San Diego, CA (US); Jelena Damnjanovic, Del Mar, CA (US); Juan Montojo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/308,855

(22) Filed: May 5, 2021

(65) Prior Publication Data

US 2022/0360422 A1    Nov. 10, 2022

(51) Int. Cl.
*H04L 5/14*   (2006.01)
*H04L 1/00*   (2006.01)
*H04W 88/06*  (2009.01)
*H04W 72/23*  (2023.01)

(52) U.S. Cl.
CPC ............. *H04L 5/14* (2013.01); *H04L 1/0025* (2013.01); *H04W 72/23* (2023.01); *H04W 88/06* (2013.01)

(58) Field of Classification Search
None
See application file for complete search history.

(56) References Cited

U.S. PATENT DOCUMENTS

| | | | |
|---|---|---|---|
| 2020/0227826 A1* | 7/2020 | Washakowski | H01Q 21/22 |
| 2020/0313837 A1* | 10/2020 | Vejlgaard | H04W 72/541 |
| 2022/0216976 A1* | 7/2022 | Zhang | H04B 17/327 |

FOREIGN PATENT DOCUMENTS

| | | | |
|---|---|---|---|
| EP | 3716521 A1 | | 9/2020 |
| WO | WO-2018034713 A1 | * | 2/2018 |
| WO | WO-2021076246 A1 | | 4/2021 |
| WO | WO-2021133678 A1 | | 7/2021 |

OTHER PUBLICATIONS

International Search Report and Written Opinion—PCT/US2022/071347—ISA/EPO—dated Sep. 1, 2022.

\* cited by examiner

*Primary Examiner* — Charles C Jiang
*Assistant Examiner* — Shawn D Miller
(74) *Attorney, Agent, or Firm* — Holland & Hart LLP

(57) ABSTRACT

Methods, systems, and devices for enabling transitions between half-duplex and full-duplex modes in wireless communications are described. A user equipment (UE) may transmit to a base station a first indication of a switching latency for transitioning between a half-duplex mode and a full-duplex mode. The UE may receive, from the base station in accordance with the first indication of the switching latency, a second indication that the UE is to transition to one of the half-duplex mode or the full-duplex mode. The UE may transition to the half-duplex mode or the full-duplex mode based on receiving the second indication.

30 Claims, 13 Drawing Sheets

ENABLING TRANSITIONS BETWEEN HALF-DUPLEX AND FULL-DUPLEX MODES

FIELD OF TECHNOLOGY

The following relates to wireless communications, including enabling transitions between half-duplex and full-duplex modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may support different types of communication modes. Improved techniques for transitioning between the communication modes may be desired.

SUMMARY

The described techniques relate to improved methods, systems, devices, and apparatuses that support enabling transitions between half-duplex and full-duplex modes. A user equipment (UE) may support a half-duplex mode for half-duplex communications and a full-duplex mode for full-duplex communications. The UE may indicate to a base station one or more switching latencies that represent the amount of time it takes the UE to switch between the half-duplex and full-duplex modes. The base station may instruct the UE to transition between the half-duplex mode and the full-duplex mode based on the one or more switching latencies indicated by the UE.

A method for wireless communication at a UE is described. The method may include transmitting, to a base station, a first indication of a switching latency for transitioning between a half-duplex mode that supports half-duplex communication and a full-duplex mode that supports full-duplex communication, receiving, from the base station in accordance with the first indication of the switching latency, a second indication that the UE is to transition to one of the half-duplex mode or the full-duplex mode, and transitioning to the half-duplex mode or the full-duplex mode based on receiving the second indication.

An apparatus for wireless communication at a UE is described. The apparatus may include a processor and a memory coupled with the processor, the memory comprising instructions executable by the processor to cause the apparatus to transmit, to a base station, a first indication of a switching latency for transitioning between a half-duplex mode that supports half-duplex communication and a full-duplex mode that supports full-duplex communication, receive, from the base station in accordance with the first indication of the switching latency, a second indication that the UE is to transition to one of the half-duplex mode or the full-duplex mode, and transition to the half-duplex mode or the full-duplex mode based on receiving the second indication.

Another apparatus for wireless communication at a UE is described. The apparatus may include means for transmitting, to a base station, a first indication of a switching latency for transitioning between a half-duplex mode that supports half-duplex communication and a full-duplex mode that supports full-duplex communication, means for receiving, from the base station in accordance with the first indication of the switching latency, a second indication that the UE is to transition to one of the half-duplex mode or the full-duplex mode, and means for transitioning to the half-duplex mode or the full-duplex mode based on receiving the second indication.

A non-transitory computer-readable medium storing code for wireless communication at a UE is described. The code may include instructions executable by a processor to transmit, to a base station, a first indication of a switching latency for transitioning between a half-duplex mode that supports half-duplex communication and a full-duplex mode that supports full-duplex communication, receive, from the base station in accordance with the first indication of the switching latency, a second indication that the UE is to transition to one of the half-duplex mode or the full-duplex mode, and transition to the half-duplex mode or the full-duplex mode based on receiving the second indication.

In some examples of the method, apparatuses, and non-transitory computer-readable medium described herein, the second indication may be included in downlink control information or a medium access control (MAC) control element (MAC-CE).

In some examples of the method, apparatuses, and non-transitory computer-readable medium described herein, a first antenna panel may be activated at the UE for half-duplex communication, and the second indication activates a second antenna panel at the UE for full duplex communication.

In some examples of the method, apparatuses, and non-transitory computer-readable medium described herein, the second indication includes scheduling information that schedules the UE for half-duplex communication or full-duplex communication.

In some examples of the method, apparatuses, and non-transitory computer-readable medium described herein, the second indication indicates a second switching latency associated with switching from the half-duplex mode to the full-duplex mode.

In some examples of the method, apparatuses, and non-transitory computer-readable medium described herein, the second switching latency includes a minimum amount of time until the UE receives downlink control information that schedules the UE for full-duplex communication and the method, apparatuses, and non-transitory computer-readable medium may include further operations, features, means, or instructions for receiving the downlink control information that schedules the UE for full duplex communication, where the downlink control information may be received after the minimum amount of time may have elapsed.

In some examples of the method, apparatuses, and non-transitory computer-readable medium described herein, the second switching latency includes an amount of time after which the base station may be permitted to transmit downlink control information that schedules the UE for full-duplex communication and the method, apparatuses, and non-transitory computer-readable medium may include further operations, features, means, or instructions for receiving the downlink control information that schedules the UE for full duplex communication, where the downlink control information may be received after the amount of time may have elapsed.

In some examples of the method, apparatuses, and non-transitory computer-readable medium described herein, the amount of time may be relative to receipt of the second indication, relative to transmission of an acknowledgment for the second indication, or relative to the end of a current scheduled transmission that includes the second indication.

In some examples of the method, apparatuses, and non-transitory computer-readable medium described herein, the second switching latency indicates an amount of time until the UE may be scheduled for full-duplex communication and the method, apparatuses, and non-transitory computer-readable medium may include further operations, features, means, or instructions for determining that the UE may be scheduled for full-duplex communication after the amount of time may have elapsed.

In some examples of the method, apparatuses, and non-transitory computer-readable medium described herein, the amount of time may be relative to receipt of the second indication, relative to transmission of an acknowledgment for the second indication, or relative to the end of a current scheduled transmission that includes the second indication.

In some examples of the method, apparatuses, and non-transitory computer-readable medium described herein, the first indication of the switching latency includes a value for the switching latency.

In some examples of the method, apparatuses, and non-transitory computer-readable medium described herein, the first indication of the switching latency includes one or more bits that indicate a range of values that includes a value of the switching latency.

Some examples of the method, apparatuses, and non-transitory computer-readable medium described herein may further include operations, features, means, or instructions for determining a respective switching latency for pairs of beams that support full-duplex communication, where the first indication of the switching latency includes a maximum latency determined for the pairs of beams.

Some examples of the method, apparatuses, and non-transitory computer-readable medium described herein may further include operations, features, means, or instructions for determining a default switching latency and determining that the switching latency may be different than the default switching latency, where the switching latency may be indicated to the base station based on the determination.

In some examples of the method, apparatuses, and non-transitory computer-readable medium described herein, the switching latency may be specific to an antenna array at the UE or specific to a pair of downlink and uplink full-duplex beams including a transmit beam and a receive beam.

Some examples of the method, apparatuses, and non-transitory computer-readable medium described herein may further include operations, features, means, or instructions for determining the switching latency based on whether the UE may be transmitting or receiving in the half-duplex mode.

In some examples of the method, apparatuses, and non-transitory computer-readable medium described herein, the switching latency may be for transitioning from the half-duplex mode to the full-duplex mode and the method, apparatuses, and non-transitory computer-readable medium may include further operations, features, means, or instructions for transmitting, to the base station, a third indication of a second switching latency for transitioning from the full-duplex mode to the half-duplex mode.

In some examples of the method, apparatuses, and non-transitory computer-readable medium described herein, the first indication may be included in a report and the method, apparatuses, and non-transitory computer-readable medium may include further operations, features, means, or instructions for including in the report a minimum timing advance for the UE to support full-duplex communication, a maximum transmit power for the UE to support full-duplex communication, a minimum subcarrier spacing (SCS) guard band for the UE to support full-duplex communication, or a combination thereof.

A method for wireless communication at a base station is described. The method may include receiving, from a UE, a first indication of a switching latency for transitioning between a half-duplex mode that supports half-duplex communication and a full-duplex mode that supports full-duplex communication, transmitting, to the UE in accordance with the first indication of the switching latency, a second indication that the UE is to transition to one of the half-duplex mode or the full-duplex mode, and scheduling the UE for half-duplex communication or full-duplex communication based at least in part transmitting the second indication.

An apparatus for wireless communication at a base station is described. The apparatus may include a processor and a memory coupled with the processor, the memory comprising instructions executable by the processor to cause the apparatus to receive, from a UE, a first indication of a switching latency for transitioning between a half-duplex mode that supports half-duplex communication and a full-duplex mode that supports full-duplex communication, transmit, to the UE in accordance with the first indication of the switching latency, a second indication that the UE is to transition to one of the half-duplex mode or the full-duplex mode, and schedule the UE for half-duplex communication or full-duplex communication based at least in part transmitting the second indication.

Another apparatus for wireless communication at a base station is described. The apparatus may include means for receiving, from a UE, a first indication of a switching latency for transitioning between a half-duplex mode that supports half-duplex communication and a full-duplex mode that supports full-duplex communication, means for transmitting, to the UE in accordance with the first indication of the switching latency, a second indication that the UE is to transition to one of the half-duplex mode or the full-duplex mode, and means for scheduling the UE for half-duplex communication or full-duplex communication based at least in part transmitting the second indication.

A non-transitory computer-readable medium storing code for wireless communication at a base station is described. The code may include instructions executable by a processor to receive, from a UE, a first indication of a switching latency for transitioning between a half-duplex mode that supports half-duplex communication and a full-duplex mode that supports full-duplex communication, transmit, to the UE in accordance with the first indication of the switching latency, a second indication that the UE is to transition to one of the half-duplex mode or the full-duplex mode, and schedule the UE for half-duplex communication or full-duplex communication based at least in part transmitting the second indication.

In some examples of the method, apparatuses, and non-transitory computer-readable medium described herein, the second indication activates an antenna panel at the UE for full duplex communication.

In some examples of the method, apparatuses, and non-transitory computer-readable medium described herein, the second indication includes a second switching latency associated with switching from the half-duplex mode to the full-duplex mode.

In some examples of the method, apparatuses, and non-transitory computer-readable medium described herein, downlink control information (DCI) schedules the UE for full-duplex communication. In some examples, the method, apparatuses, and non-transitory computer-readable medium may include further operations, features, means, or instructions for determining the second switching latency based on a subcarrier spacing associated with the DCI, a subcarrier spacing associated with downlink transmissions for the full-duplex communication, a subcarrier associated with uplink transmissions for the full-duplex communication, or a combination thereof.

In some examples of the method, apparatuses, and non-transitory computer-readable medium described herein, the second switching latency includes an amount of time after which the base station may be permitted to transmit downlink control information that schedules the UE for full-duplex communication and the method, apparatuses, and non-transitory computer-readable medium may include further operations, features, means, or instructions for transmitting, after the amount of time may have elapsed, the downlink control information that schedules the UE for full duplex communication.

In some examples of the method, apparatuses, and non-transitory computer-readable medium described herein, the amount of time may be relative to receipt of the second indication at the UE, relative to transmission of an acknowledgment for the second indication by the UE, or relative to the end of a current scheduled transmission that includes the second indication.

In some examples of the method, apparatuses, and non-transitory computer-readable medium described herein, the second switching latency indicates an amount of time until the UE may be scheduled for full-duplex communication and the method, apparatuses, and non-transitory computer-readable medium may include further operations, features, means, or instructions for scheduling the UE for full-duplex communication after the amount of time may have elapsed.

In some examples of the method, apparatuses, and non-transitory computer-readable medium described herein, the amount of time may be relative to receipt of the second indication at the UE, relative to transmission of an acknowledgment for the second indication by the UE, or relative to the end of a current scheduled transmission that includes the second indication.

In some examples of the method, apparatuses, and non-transitory computer-readable medium described herein, the first indication of the switching latency includes a value for the switching latency.

In some examples of the method, apparatuses, and non-transitory computer-readable medium described herein, the first indication of the switching latency includes one or more bits that indicate a range of values that includes a value of the switching latency.

Some examples of the method, apparatuses, and non-transitory computer-readable medium described herein may further include operations, features, means, or instructions for determining a default switching latency and transmitting an indication of the default switching latency to the UE.

In some examples of the method, apparatuses, and non-transitory computer-readable medium described herein, the switching latency may be specific to an antenna array at the UE or specific to a pair of downlink and uplink full-duplex beams including a transmit beam and a receive beam.

In some examples of the method, apparatuses, and non-transitory computer-readable medium described herein, the switching latency may be for transitioning from the half-duplex mode to the full-duplex mode and the method, apparatuses, and non-transitory computer-readable medium may include further operations, features, means, or instructions for receiving, from the UE, a third indication of a second switching latency for transitioning from the full-duplex mode to the half-duplex mode.

DETAILED DESCRIPTION

A user equipment (UE) may support different types of communication modes. For example, a UE may support a half-duplex mode in which the UE is capable of performing half-duplex communications and a full-duplex mode in which the UE is capable of performing full-duplex communication. Before switching the UE from half-duplex communication to full-duplex communication (or vice versa), a base station may indicate the switch to the UE so that the UE can transition to the appropriate communication mode. However, the base station may be unaware of how long it takes the UE to transition between communication modes, which may be referred to as the UE's switching latency. In such a scenario, the base station may inadvertently schedule the UE for full-duplex communication before the UE has transitioned to the full-duplex mode. Thus, the UE may be unable to engage in the scheduled full-duplex communication, which may negatively impact system performance.

According to the techniques described herein, a UE may indicate to a base station the switching capabilities (e.g., switching latencies) of the UE. The base station may then instruct the UE to transition between communication modes based on one or more of the switching latencies. Thus, the base station may ensure that the UE is prepared for a certain type of communication (e.g., full-duplex communication) before scheduling the UE for that type of communication.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to enabling transitions between half-duplex and full-duplex modes.

Figure 1:
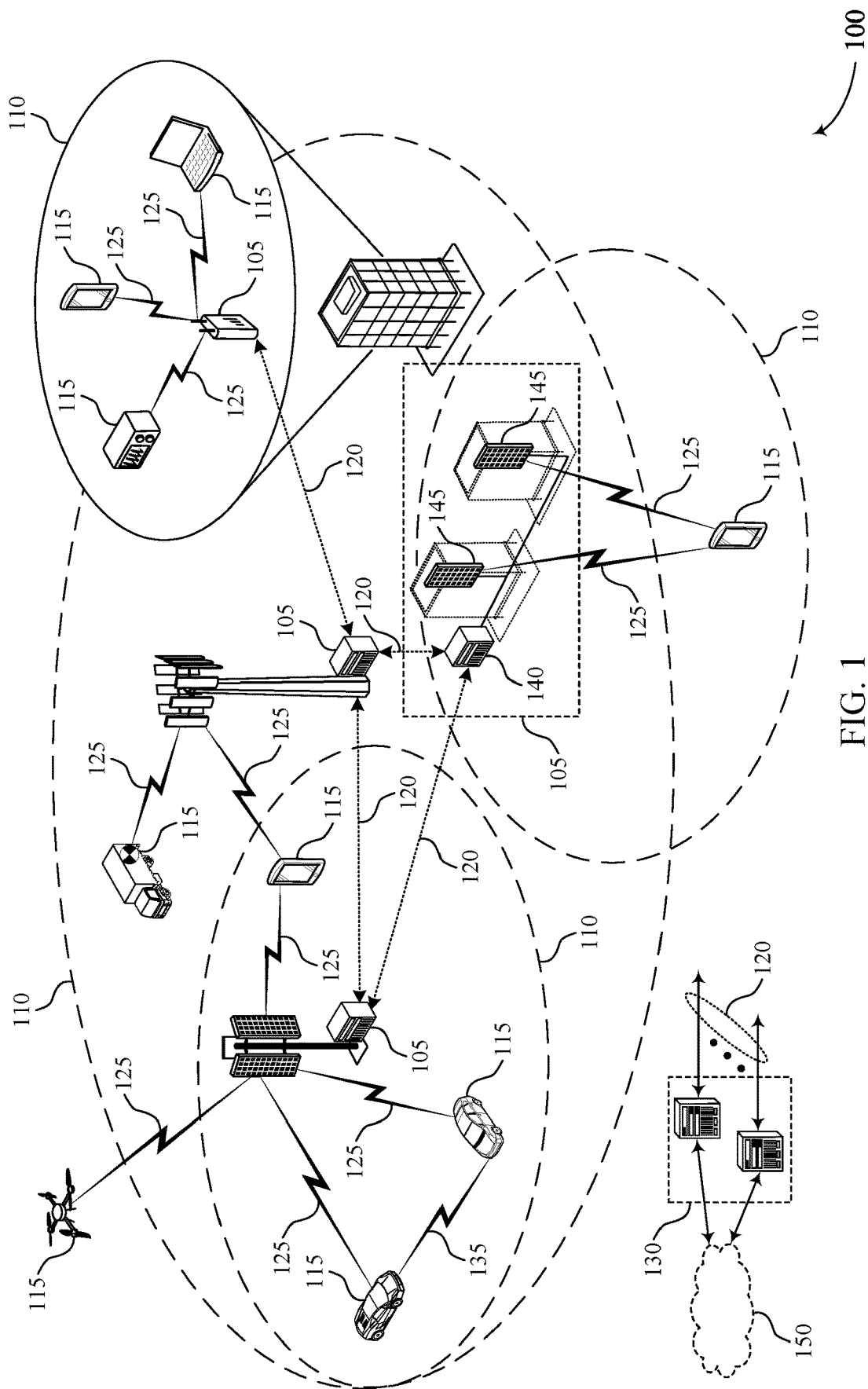
FIG. 1 illustrates an example of a wireless communications system that supports enabling transitions between half-duplex and full-duplex modes in accordance with aspects of the present disclosure.

FIG. 1 illustrates an example of a wireless communications system 100 that supports enabling transitions between half-duplex and full-duplex modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both)

may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peerto-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may support a half-duplex mode for half-duplex communication and a full-duplex mode for full-duplex communications. Half-duplex communication may refer to communication between two devices that occurs in one direction at a time. For example, when implementing half-duplex communication, a UE 115 may engage in uplink communication and downlink communication at different times (but not at the same time). Full-duplex communication may refer to communication between two devices that occurs in two directions at a time. For example, when implementing full-duplex communication, a UE 115 may engage in uplink communication and downlink communication simultaneously. A UE 115 may use one antenna panel at a time for half-duplex communication (e.g., one antenna panel for uplink communication or downlink communication) and may use two or more antenna panels at a time for full-duplex communication (e.g., a first antenna panel for uplink communications and a second antenna panel for downlink communications). Each antenna panel may include one or more antenna arrays that the UE 115 may use for beamforming.

A UE 115 may transition between half-duplex communication and full-duplex communication by transitioning between the half-duplex mode and the full-duplex mode. But transitioning between communication modes may take an amount of time, referred to as the UE's mode switching latency or "switching latency." To ensure that a base station 105 allows the UE 115 an appropriate amount of time to transition between communication modes, the UE 115 may indicate to the base station the switching capabilities of the UE 115. For example, the UE 115 may indicate the amount of time it takes the UE 115 to transition from the half-duplex mode to the full-duplex mode, which may be referred to as the UE's full-duplex switching latency. As another example, the UE 115 may indicate the amount of time it takes the UE 115 to transition from the full-duplex mode to the half-duplex mode, which may be referred to as the UE's half-duplex switching latency. In some examples, the full-duplex switching latency may be longer than the half-duplex switching latency (e.g., because it may take longer to configure interference cancelation and activate a second antenna panel than to turn off interference cancelation and deactivate the second antenna panel). A switching latency may also be referred to as a panel activation latency, a transition latency, a switching delay, a transition delay, a switching capability, a transition capability, or other suitable terminology.

Figure 2:
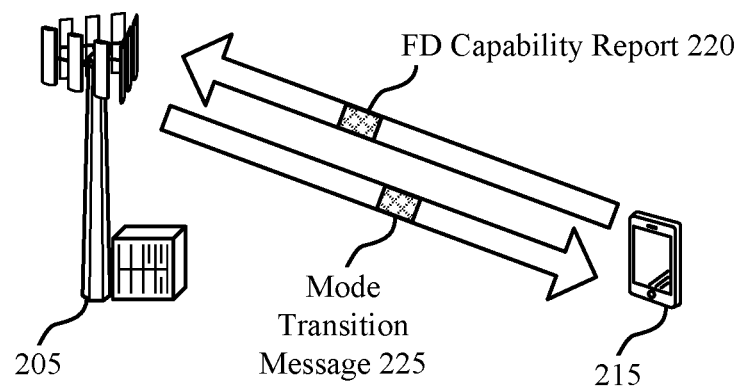
FIG. 2 illustrates an example of a wireless communications system that supports enabling transitions between half-duplex and full-duplex modes in accordance with aspects of the present disclosure.

FIG. 2 illustrates an example of a wireless communications system 200 that supports enabling transitions between half-duplex and full-duplex modes in accordance with aspects of the present disclosure. The wireless communications system 200 may include a base station 205 and a UE 215, which may be examples of a base station 105 and a UE 115, respectively, as described with reference to FIG. 1. The base station 205 and the UE 215 may implement aspects of the techniques described herein so that the UE 215 is able to timely transition between communication modes.

The UE 215 may support a half-duplex mode for half-duplex communication and a full-duplex mode for full-duplex communication. The UE 215 may support half-duplex communication with the base station 205 or with a transmission reception point (TRP) associated with the base station 205. Similarly, the UE 215 may support full-duplex communication with the base station 205, with multiple base stations, or with multiple TRPs associated with the base station 205. For instance, the UE 215 may engage in simultaneous uplink and downlink communication with the base station 205 (or with multiple base stations) or the UE 215 may engage in simultaneous uplink and downlink communication with two TRPs of the base station 205 (e.g., the UE 215 may simultaneously engage in uplink communications with a first TRP of the base station 205 and downlink communications with a second TRP of the base station 205). Thus, the base station 205 may (alone or with another base station) support full-duplex communication with the UE 215 (or the base station 205 be associated with TRPs that, collectively, support full-duplex communication with the UE 215).

If the UE 215 engages in full-duplex communication, the UE 215 may preform digital interference cancelation to reduce self-interference at the UE 215. Self-interference may refer to interference experienced by one beam (e.g., a receive beam) of the UE 215 that is caused by another beam of the UE 215 (e.g., a transmit beam). Digital interference cancelation may also be referred to as self-interference cancelation (SIC).

To enable efficient and timely transitions between communications modes, the UE 215 may send a full-duplex (FD) capability report 220 to the base station 205. The FD capability report 220 may indicate the FD capabilities of the UE 215, which may include the full-duplex switching latency of the UE 215, the half-duplex switching latency of the UE 215, or both. As noted, the full-duplex switching latency may indicate the amount of time it takes the UE 215 to transition to the full-duplex mode, which may include the amount of time it takes the UE 215 to activate one or more antenna panels and/or configure digital cancelation. The UE 215 may be considered as being in the full-duplex mode when the UE 215 is capable of simultaneously transmitting and receiving. The single-duplex switching latency may indicate the amount of time it takes the UE 215 to transition to the half-duplex mode, which may include to the amount of time it takes to deactivate one or more antenna panels and/or to stop performing digital cancelation. The UE 215 may be considered as being in the half-duplex mode when the UE 215 is incapable of simultaneously transmitting and receiving.

In some examples, the FD capability report 220 may indicate multiple full-duplex switching latencies that correspond to different beam pairs or antenna arrays. For example, the FD capability report 220 may indicate a first full-duplex switching latency for a first beam pair capable of full-duplex communications (e.g., a downlink/receive beam and an uplink/transmit beam) and a second full-duplex switching latency for a second beam pair capable of full-duplex communications. Thus, the full-duplex switching latencies may be beam pair-specific. As another example, the FD capability report 220 may indicate a first full-duplex switching latency for a first antenna array of the UE 215 and a second full-duplex switching latency for a second antenna array. Thus, the full-duplex switching latencies may be antenna array-specific. Differences between full-duplex switching latencies may a function of spatial isolation associated beam pairs or antenna arrays and/or digital cancelation associated with the beams pairs or antenna arrays. Although described with reference to full-duplex switching latencies, half-duplex switching latencies may additionally or alternatively be beam pair-specific or antenna array-specific.

In some examples, the FD capability report 220 may indicate multiple full-duplex switching latencies (and/or half-duplex switching latencies) that correspond to different types of transitions. For example, the FD capability report 220 may indicate a first full-duplex switching latency that corresponds to the scenario in which the UE 215 transitions from uplink communication in the half-duplex mode and a second full-duplex switching latency that corresponds to the scenario in which the UE 215 transitions from downlink communication in the half-duplex mode. Similarly, the FD capability report 220 may indicate a first half-duplex switching latency that corresponds to the scenario in which the UE 215 transitions to uplink communication in the half-duplex mode and a second half-duplex switching latency that corresponds to the scenario in which the UE 215 transitions to downlink communication in the half-duplex mode. Thus, the switching latencies indicated by the UE 215 may vary with the direction of communication in the half-duplex mode (referred to as the half-duplex communication direction).

In some examples, the FD capability report 220 may indicate the actual value of a switching latency (which may also be referred to as the real value). For example, the FD capability report 220 may include a quantity of bits that explicitly indicate the value x, where x is the switching latency in temporal units (e.g., milliseconds, microseconds). In other examples, the FD capability report 220 may indicate a range of values within which the switching latency falls. For instance, if there are n ranges of values predefined or preconfigured at the UE 215, the FD capability report 220 may include one or more bits that indicate one of the n ranges that includes the value of the switching latency. As an example, there may be four predefined groups of values and the FD capability report 220 may include two bits that indicate one of the four groups. Indicating a range of values as opposed to the actual value of the switching latency may reduce overhead signaling, whereas indicating the actual value as opposed to a range of values may provide more granularity for control. If the UE 215 determines multiple full-duplex switching latencies (e.g., for different beam pairs or antenna arrays), the UE 215 may report the maximum full-duplex switching latency (as opposed to all of the full-duplex switching latencies). In some examples, the UE 215 may report the maximum value of the switching latency that falls in the range of a particular group.

The base station 205 may use the switching latencies indicated in the FD capability report 220 to transition the UE 215 between communication modes. For example, before engaging the UE 215 in full-duplex communications, the base station 205 may transmit to the UE 215 a mode transition message 225 that instructs or prompts the UE 215 to transition between communication modes (e.g., from the half-duplex mode to the full-duplex mode). The mode transition message 225 activate or deactivate one or more antenna panels at the UE 215. For example, if the UE 215 is using a single antenna panel for half-duplex communication, the mode transition message 225 may activate a second antenna panel for full-duplex communication. Additionally or alternatively, the mode transition message 225 may indicate a timing for the transition that is based on the switching capabilities of the UE 215. The timing may be relative to one or more predefined events and may indicate when the UE 215 is scheduled for full-duplex communication or when the UE 215 can expect to receive downlink scheduling information (DCI) that schedules full-duplex communication.

Figure 3:
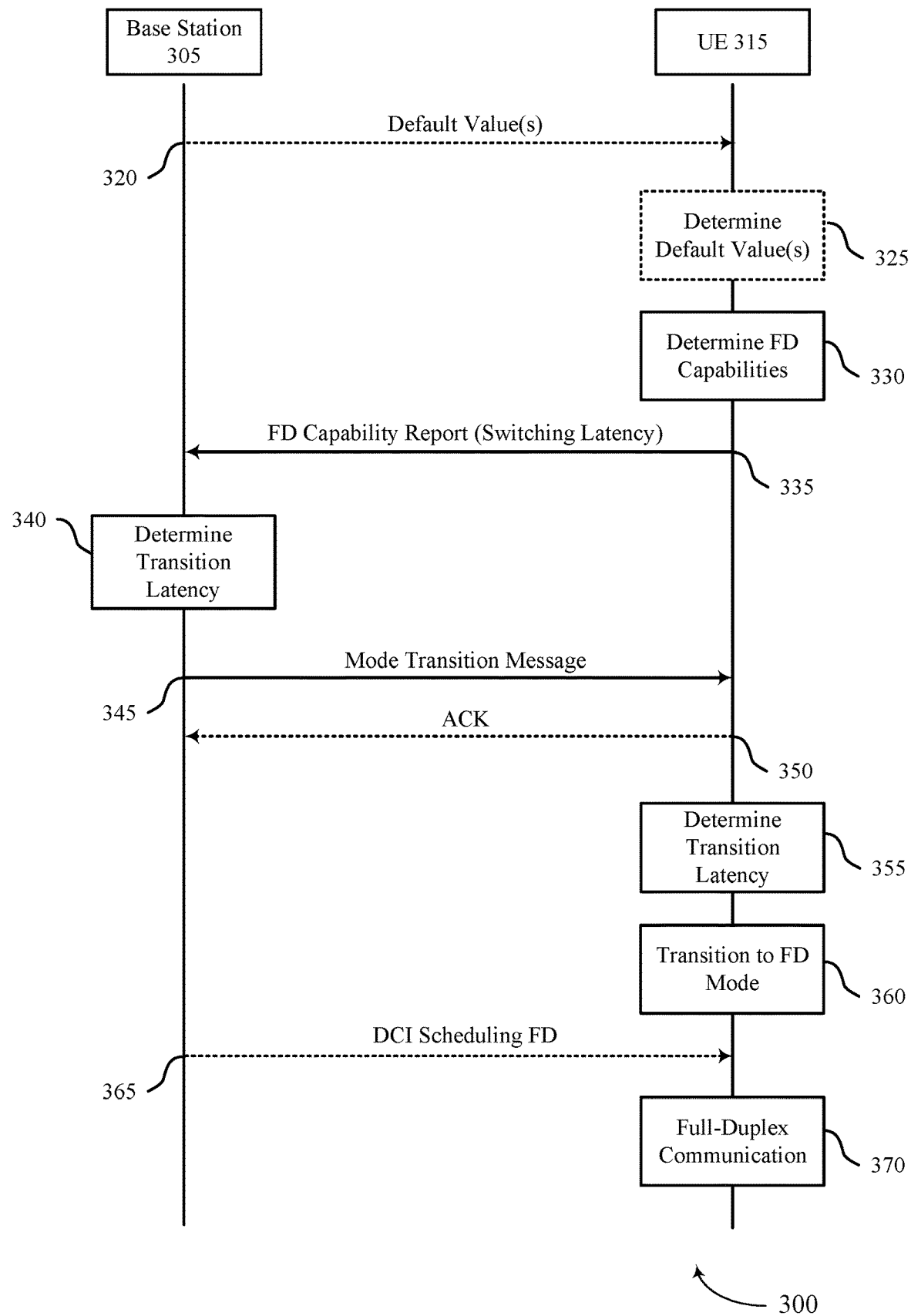
FIG. 3 illustrates an example of a process flow that supports enabling transitions between half-duplex and full-duplex modes in accordance with aspects of the present disclosure.

FIG. 3 illustrates an example of a process flow 300 that supports enabling transitions between half-duplex and full-duplex modes in accordance with aspects of the present disclosure. In some examples, the process flow 300 may be related to aspects of the wireless communications system 100 or the wireless communications system 200. For example, the process flow 300 may be implemented by a base station 305 and a UE 315, which may be examples of a base station and a UE as described herein. Process flow 300 may illustrate operations of the base station 305 and the UE 315 that enable the UE 315 to timely transition between communication modes.

At 320, the base station may transmit one or more default values to the UE 315. The default values may be for or represent default switching latencies (e.g., a default half-duplex switching latency, a default full-duplex switching latency). In some examples, the default switching latency may be zero. At 325, the UE 315 may determine one or more default switching latencies. In some examples, the UE 315 may determine the default switching latencies based on the default values received from the base station at 320. In some examples, the default switching latencies may be preconfigured or predefined at the UE 315. In some examples, the default switching latencies may be derived by the UE 315 based on one or more parameters internal to the UE 315 or signaled by the base station 305.

At 330, the UE 315 may determine full-duplex capabilities. For example, the UE 315 may determine that the UE 315 is capable of full-duplex communication (e.g., the UE 315 may determine that the UE 315 supports a full-duplex mode). Additionally or alternatively, the UE 315 may determine one or more switching latencies (e.g., the UE 315 may determine one or more full-duplex switching latencies and/ or one or more half-duplex switching latencies). The ability of the UE 315 to support full-duplex communication may be conditioned on beam separation at the UE 315, self-interference cancelation capabilities of the UE 315, and/or the extent of clutter echo (e.g., self-interference caused by reflections), among other aspects. Relative to half-duplex communication, use of full-duplex communication may reduce latency and enhance spectrum utilization and efficiency, among other benefits.

In some examples, the UE 315 may determine a switching latency (e.g., a full-duplex switching latency, a half-duplex switching latency) based on one or more subcarrier spacings (SCSs). For example, if DCI for the UE 315 is on the same component carrier as the half-duplex communications and full-duplex communications, the switching latency may be based on (e.g., depend on) the SCS associated with the downlink ("downlink SCS"), the SCS associated with the uplink ("uplink SCS"), or both. If the DCI for the UE 315 is on a different carrier than the half-duplex and full-duplex communications, the switching latency may be based on the SCS associated with the DCI ("DCI SCS"), the downlink SCS, the uplink SCS, or a combination thereof. For example, referring to a group of SCSs that includes the DCI SCS, the downlink SCS, and the uplink SCS, the UE 315 may determine the switching latency based on the maximum SCS in the group, the minimum SCS in the group, or all SCSs in the group. Thus, the switching latencies of the UE 315 may vary based on whether DCI for the UE 315 is on the same component carrier as the half-duplex and full-duplex communications.

If the UE 315 determines switching latencies on a beam-pair basis or antenna-array basis, the UE 315 may determine the switching latencies based on the spatial isolation for the beam pairs (or antenna arrays). Additionally or alternatively, the UE 315 may determine the switching latencies based on the digital cancelation associated with the beam pairs (or each antenna arrays). Thus, the switching latencies may be based on spatial isolation, digital cancelation, or both, among other factors (e.g., transmit power). In a carrier aggregation (CA) scenario, cross carriers may be associated with different switching latencies.

At 335, the UE 315 may transmit an FD capability report to the base station 305. The FD capability report may indicate one or more full-duplex capabilities of the UE 315, such as the switching latencies of the UE 315. The UE 315 may transmit the FD capability report periodically, semi-persistently, statically, or dynamically, among other options. In some examples, the UE 315 may transmit the FD capability report based on a switching latency of the UE 315 being different than a corresponding default switching latency. For example, the UE 315 may send the FD capability report indicating the full-duplex switching latency of the UE 315 if the full-duplex switching latency of the UE 315 is different than the default full-duplex switching latency determined at 325. In some examples, the UE 315 may transmit the FD capability report if one or more switching capabilities at the UE 315 has changed since a previous FD capability report. In some examples, the UE 315 may transmit the FD capability report based on successfully completing random access with the base station 305. In some examples, the UE 315 may transmit the FD capability report in response to a prompt from the base station 305.

In some examples, the FD capability report indicates one or more parameters that supports full-duplex communication at the UE 315. For example, the FD capability report may indicate a minimum timing advance (TA) timing for the UE 315 to support full-duplex communication in the full-duplex mode. Additionally or alternatively, the FD capability report may indicate a guard band, guard symbols, or both, that support full-duplex communication at the UE 315 in the full-duplex mode. The guard band, guard symbols, or both may be associated with an SCS for the UE 315. Additionally or alternatively, the FD capability report may indicate a maximum transmit power (e.g., of the UE 315) that supports full-duplex communication at the UE 315 in the full-duplex mode.

At 340, the base station 305 may determine a transition latency for the UE 315. The base station 305 may determine the transition latency based on the switching latencies of the UE 315 or the default switching latencies (e.g., if the UE 315 does not send the FD capability report at 335). The transition latency may indicate a timing for when the UE 315 should transition between communication modes. The transition latency may also be referred to as a second switching latency, where the switching latency indicated by the FD capability report is the first switching latency.

In some examples, the base station 305 may determine the transition latency for the UE 315 based on one or more SCSs, which may be different for different component carriers. For example, if DCI for the UE 315 is on the same component carrier as the half-duplex communications and full-duplex communications, the transition latency may be based on the downlink SCS, the uplink SCS, or both. If the DCI for the UE 315 is on a different carrier than the half-duplex and full-duplex communications, the transition latency may be based on the DCI SCS, the downlink SCS, the uplink SCS, or a combination thereof. For example, referring to a group of SCSs that includes the DCI SCS, the downlink SCS, and the uplink SCS, the base station 305 may determine the transition latency based on the maximum SCS in the group, the minimum SCS in the group, or all SCSs in the group. Thus, the transition latency may vary based on whether DCI for the UE 315 is on the same component carrier as the half-duplex and full-duplex communications.

At 345, the base station 305 may transmit a mode transition message to the UE 315. The mode transition message may activate or deactivate one or more antenna panels at the UE 315. Additionally or alternatively, the mode transition message may indicate the transition latency determined at 340. In some examples, the mode transition message may be or include DCI. In some examples, the mode transition message may be or include a medium access control (MAC) control element (CE) (MAC-CE). At 350, the UE 315 may send an acknowledgment (ACK) to the base station 305 indicating that the UE 315 successfully received and decoded the mode transition message.

At 355, the UE 315 may determine the transition latency. In some examples, the transition latency may be a virtual latency that indicates an amount of time (e.g., a minimum amount of time) until the UE 315 receives DCI scheduling a full-duplex communication or a half-duplex communication. For instance, if the UE 315 is operating in the half-duplex mode, the virtual latency may indicate a minimum amount of time (e.g., X1 ms) until the UE 315 receives DCI scheduling full-duplex communication (e.g., the transition mode message may indicate that the UE 315 will not receive scheduling DCI for full-duplex communication until X1 ms have elapsed). Put another way, the virtual latency may indicate an amount of time after which the base station 305 is permitted to send DCI that schedules full-duplex communication (but during which the base station 305 is prohibited from sending said DCI). Thus, if the UE 315 is operating in the full-duplex mode, the virtual latency may indicate a minimum amount of time until the UE 315 receives DCI scheduling half-duplex communication. A similar technique may be used for transitioning the UE 315 from the full-duplex mode to the half-duplex mode.

In some examples, the transition latency may be a real latency that indicates an amount of time until the UE 315 is scheduled for full-duplex communication or half-duplex communication. For instance, if the UE 315 is operating in the half-duplex mode, the real latency may indicate an amount of time (e.g., X2 ms) until full-duplex communications are to occur. If the UE 315 is operating in the full-duplex mode, the real latency may indicate an amount of time until half-duplex communications are to occur. A similar technique may be used for transitioning the UE 315 from the full-duplex mode to the half-duplex mode.

In some examples, the transition latency may be defined relative to transmission or reception of the mode transition message (e.g., a timer for the transition latency may be started when the mode transition message is transmitted or received). The mode transition message may be or be included in DCI or a MAC-CE. In some examples, the transition latency may be defined relative to transmission or reception of the ACK (e.g., a timer for the transition latency may be started when the ACK is transmitted or received). In some examples, the transition latency may be defined relative to the end of the currently scheduled transmission (e.g., the transmission that includes the mode transition message). So, after the end of the currently scheduled transmission, a timer may start counting the transition latency, which may be defined relative to transmission or reception of the mode transition message (e.g., a timer for the transition latency may be started when the mode transition message is transmitted or received). Alternatively, the transition latency may be defined relative to transmission or reception of the ACK for the mode transition message (e.g., a timer for the transition latency may be started when the ACK is transmitted or received). Other definitions of the transition latency are contemplated and are within the scope of the present disclosure. As noted, the transition latency may indicate when the UE 215 is expected to engage in full-duplex communication or the transition latency may indicate the earliest time UE 215 can expect to receive DCI that schedules full-duplex communication.

At 360, the UE 315 may transition from the half-duplex mode to the full-duplex mode. The UE 315 may transition to the full-duplex mode based on receiving the mode transition message at 345. The timing of the transition may be based on the transition latency indicated by the mode transition message 345.

At 365, the base station 305 may transmit DCI that schedules the UE 315 for full-duplex communication. The base station 305 may transmit the DCI based on (e.g., according to) the transition latency. At 370, the UE 315 may engage in full-duplex communication with the base station 305 and/or another wireless device. The UE 315 may engage in the full-duplex communication based on the DCI received at 365 or based on DCI received before 365 (e.g., the UE 315 may engage in the full-duplex communication based on DCI that conveyed the mode transition message 345).

Thus, the UE 315 may employ the techniques described herein to timely transition between communication modes. Although described with reference to the UE 315 transitioning from the half-duplex mode to the full-duplex mode, the techniques described herein may be implemented for transitioning from the full-duplex mode to the half-duplex mode.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 4:
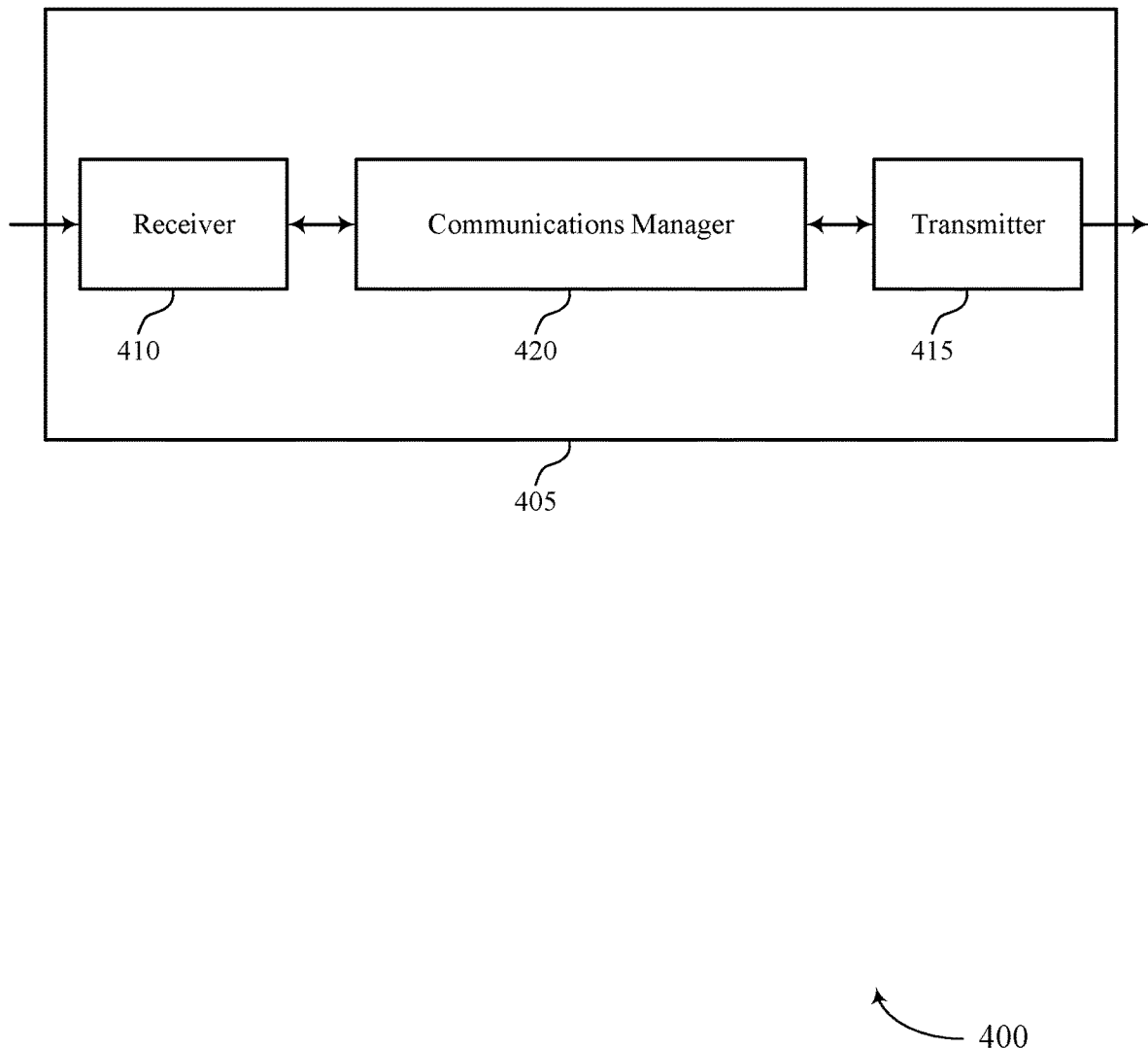
FIGS. 4 and 5 show block diagrams of devices that support enabling transitions between half-duplex and full-duplex modes in accordance with aspects of the present disclosure.

FIG. 4 shows a block diagram 400 of a device 405 that supports enabling transitions between half-duplex and full-duplex modes in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to enabling transitions between half-duplex and full-duplex modes). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to enabling transitions between half-duplex and full-duplex modes). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of enabling transitions between half-duplex and full-duplex modes as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting, to a base station, a first indication of a switching latency for transitioning between a half-duplex mode that supports half-duplex communication and a full-duplex mode that supports full-duplex communication. The communications manager 420 may be configured as or otherwise support a means for receiving, from the base station in accordance with the first indication of the switching latency, a second indication that the UE is to transition to one of the half-duplex mode or the full-duplex mode. The communications manager 420 may be configured as or otherwise support a means for transitioning to the half-duplex mode or the full-duplex mode based on receiving the second indication.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources.

Figure 5:
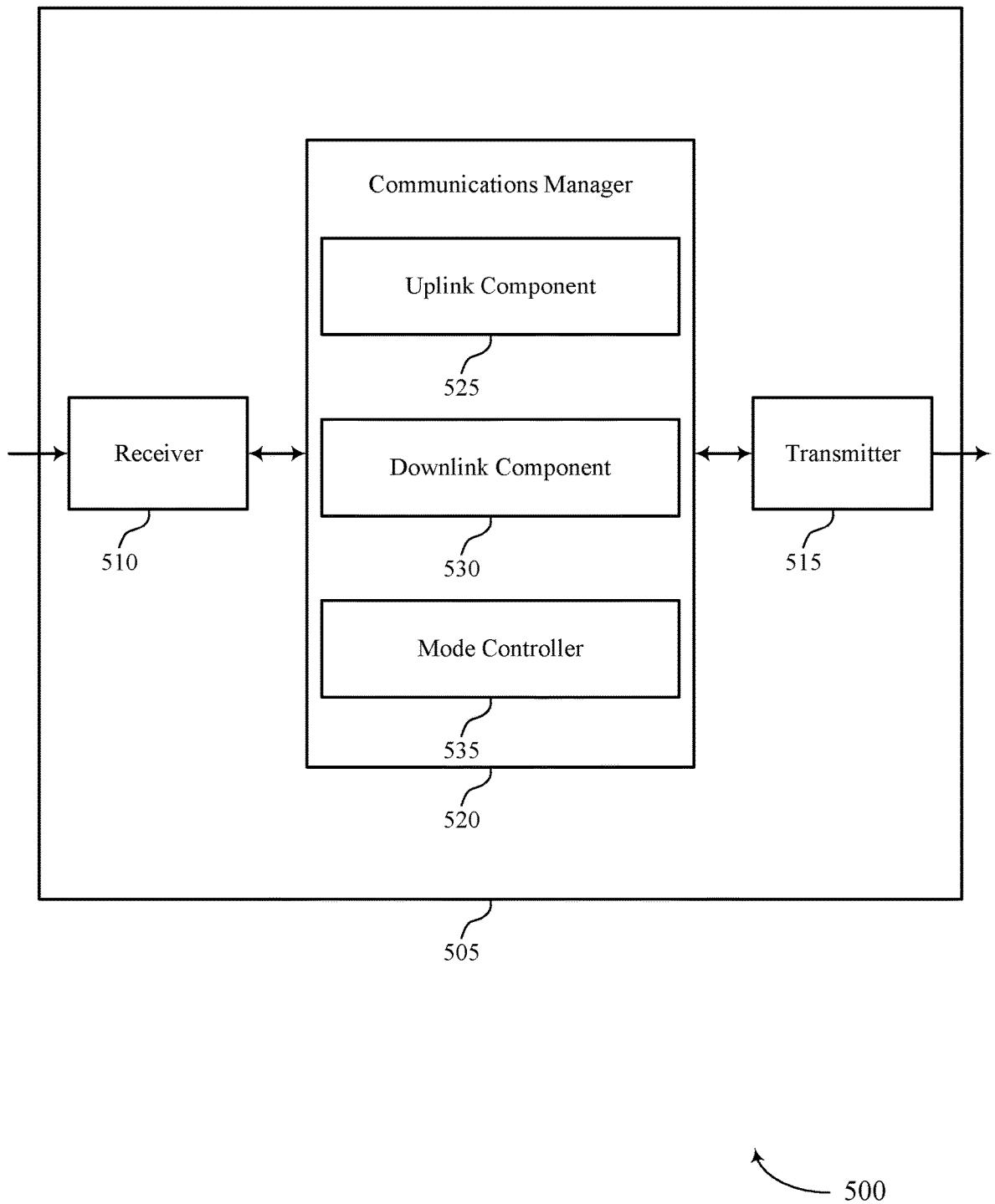

FIG. 5 shows a block diagram 500 of a device 505 that supports enabling transitions between half-duplex and full-duplex modes in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enabling transitions between half-duplex and full-duplex modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enabling transitions between half-duplex and full-duplex modes). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of enabling transitions between half-duplex and full-duplex modes as described herein. For example, the communications manager 520 may include an uplink component 525, a downlink component 530, a mode controller 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The uplink component 525 may be configured as or otherwise support a means for transmitting, to a base station, a first indication of a switching latency for transitioning between a half-duplex mode that supports half-duplex communication and a full-duplex mode that supports full-duplex communication. The downlink component 530 may be configured as or otherwise support a means for receiving, from the base station in accordance with the first indication of the switching latency, a second indication that the UE is to transition to one of the half-duplex mode or the full-duplex mode. The mode controller 535 may be configured as or otherwise support a means for transitioning to the half-duplex mode or the full-duplex mode based on receiving the second indication.

Figure 6:
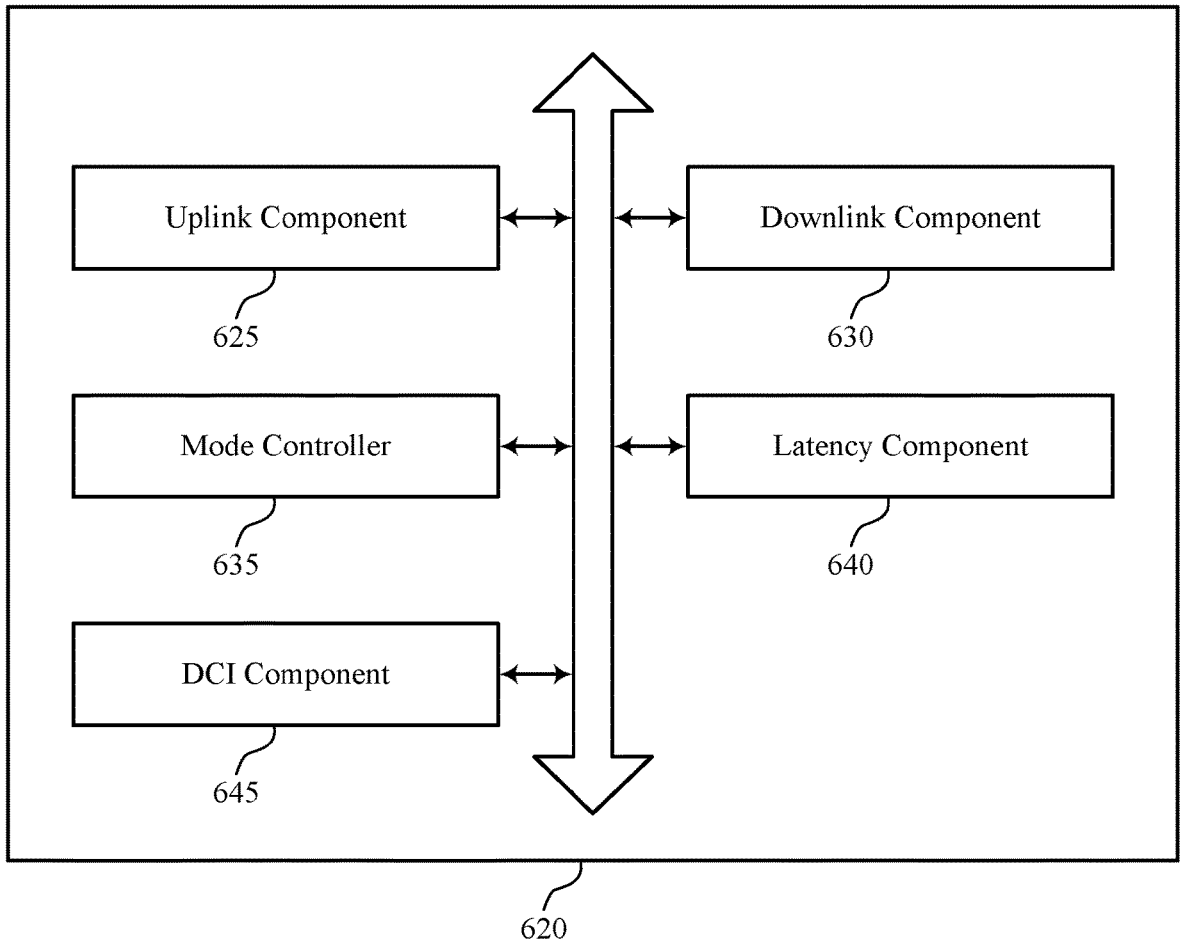
FIG. 6 shows a block diagram of a communications manager that supports enabling transitions between half-duplex and full-duplex modes in accordance with aspects of the present disclosure.

FIG. 6 shows a block diagram 600 of a communications manager 620 that supports enabling transitions between half-duplex and full-duplex modes in accordance with aspects of the present disclosure. The communications manager 620 may be an example of aspects of a communications manager 420, a communications manager 520, or both, as described herein. The communications manager 620, or various components thereof, may be an example of means for performing various aspects of enabling transitions between half-duplex and full-duplex modes as described herein. For example, the communications manager 620 may include an uplink component 625, a downlink component 630, a mode controller 635, a latency component 640, a DCI component 645, or any combination thereof. Each of these components may communicate, directly or indirectly, with one another (e.g., via one or more buses).

The communications manager 620 may support wireless communication at a UE in accordance with examples as disclosed herein. The uplink component 625 may be configured as or otherwise support a means for transmitting, to a base station, a first indication of a switching latency for transitioning between a half-duplex mode that supports half-duplex communication and a full-duplex mode that supports full-duplex communication. The downlink component 630 may be configured as or otherwise support a means for receiving, from the base station in accordance with the first indication of the switching latency, a second indication that the UE is to transition to one of the half-duplex mode or the full-duplex mode. The mode controller 635 may be configured as or otherwise support a means for transitioning to the half-duplex mode or the full-duplex mode based on receiving the second indication.

In some examples, the second indication is included in downlink control information or a MAC-CE. In some examples, a first antenna panel is activated at the UE for half-duplex communication. In some examples, the second indication activates a second antenna panel at the UE for full duplex communication.

In some examples, the second indication includes scheduling information that schedules the UE for half-duplex communication or full-duplex communication. In some examples, the second indication indicates a second switching latency associated with switching from the half-duplex mode to the full-duplex mode.

In some examples, the second switching latency includes a minimum amount of time until the UE receives downlink control information that schedules the UE for full-duplex communication, and the DCI component 645 may be configured as or otherwise support a means for receiving the downlink control information that schedules the UE for full duplex communication, where the downlink control information is received after the minimum amount of time has elapsed.

In some examples, the second switching latency includes an amount of time after which the base station is permitted to transmit downlink control information that schedules the UE for full-duplex communication, and the DCI component 645 may be configured as or otherwise support a means for receiving the downlink control information that schedules the UE for full duplex communication, where the downlink control information is received after the amount of time has elapsed.

In some examples, the amount of time is relative to receipt of the second indication, relative to transmission of an acknowledgment for the second indication, or relative to the end of a current scheduled transmission that includes the second indication.

In some examples, the second switching latency indicates an amount of time until the UE is scheduled for full-duplex communication, and the DCI component 645 may be configured as or otherwise support a means for determining that the UE is scheduled for full-duplex communication after the amount of time has elapsed.

In some examples, the amount of time is relative to receipt of the second indication, relative to transmission of an acknowledgment for the second indication, or relative to the end of a current scheduled transmission that includes the second indication.

In some examples, the first indication of the switching latency includes a value for the switching latency. In some examples, the first indication of the switching latency includes one or more bits that indicate a range of values that includes a value of the switching latency.

In some examples, the latency component 640 may be configured as or otherwise support a means for determining a respective switching latency for pairs of beams that support full-duplex communication, where the first indication of the switching latency includes a maximum latency determined for the pairs of beams.

In some examples, the latency component 640 may be configured as or otherwise support a means for determining a default switching latency. In some examples, the latency component 640 may be configured as or otherwise support a means for determining that the switching latency is different than the default switching latency, where the switching latency is indicated to the base station based on the determination.

In some examples, the switching latency is specific to an antenna array at the UE or specific to a pair of downlink and uplink full-duplex beams including a transmit beam and a receive beam. In some examples, the latency component 640 may be configured as or otherwise support a means for determining the switching latency based on whether the UE is transmitting or receiving in the half-duplex mode.

In some examples, the switching latency is for transitioning from the half-duplex mode to the full-duplex mode, and the uplink component 625 may be configured as or otherwise support a means for transmitting, to the base station, a third indication of a second switching latency for transitioning from the full-duplex mode to the half-duplex mode.

In some examples, the first indication is included in a report, and the uplink component 625 may be configured as or otherwise support a means for including in the report a minimum timing advance for the UE to support full-duplex communication, a maximum transmit power for the UE to support full-duplex communication, a minimum SCS guard band for the UE to support full-duplex communication, or a combination thereof.

Figure 7:
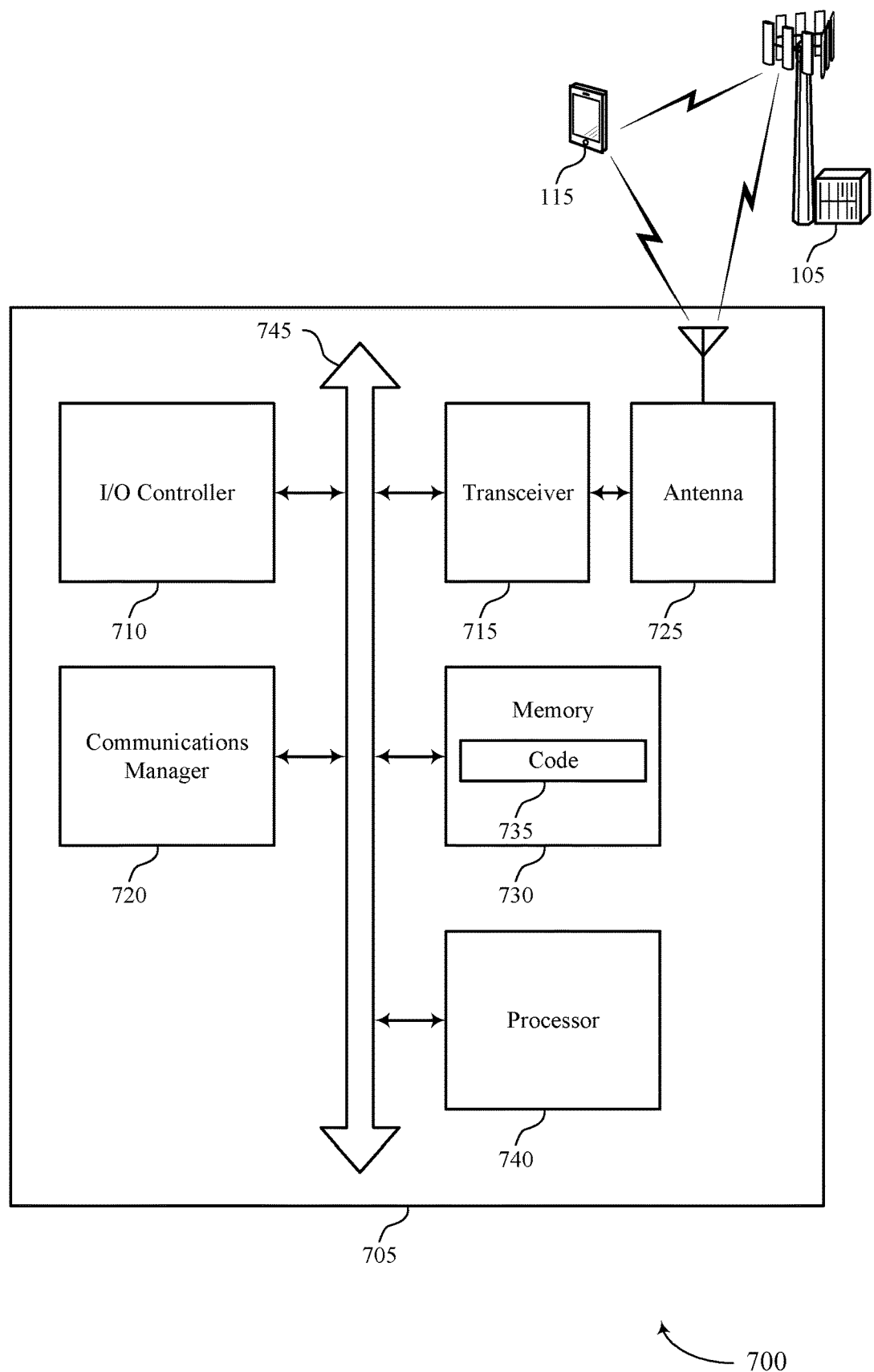
FIG. 7 shows a diagram of a system including a device that supports enabling transitions between half-duplex and full-duplex modes in accordance with aspects of the present disclosure.

FIG. 7 shows a diagram of a system 700 including a device 705 that supports enabling transitions between half-duplex and full-duplex modes in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting enabling transitions between half-duplex and full-duplex modes). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting, to a base station, a first indication of a switching latency for transitioning between a half-duplex mode that supports half-duplex communication and a full-duplex mode that supports full-duplex communication. The communications manager 720 may be configured as or otherwise support a means for receiving, from the base station in accordance with the first indication of the switching latency, a second indication that the UE is to transition to one of the half-duplex mode or the full-duplex mode. The communications manager 720 may be configured as or otherwise support a means for transitioning to the half-duplex mode or the full-duplex mode based on receiving the second indication.

By including or configuring the communications manager 720 in accordance with examples as described herein, the device 705 may support techniques for reduced latency and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of enabling transitions between half-duplex and full-duplex modes as described herein, or the processor 740 and the memory 730 may be otherwise configured to perform or support such operations.

Figure 8:
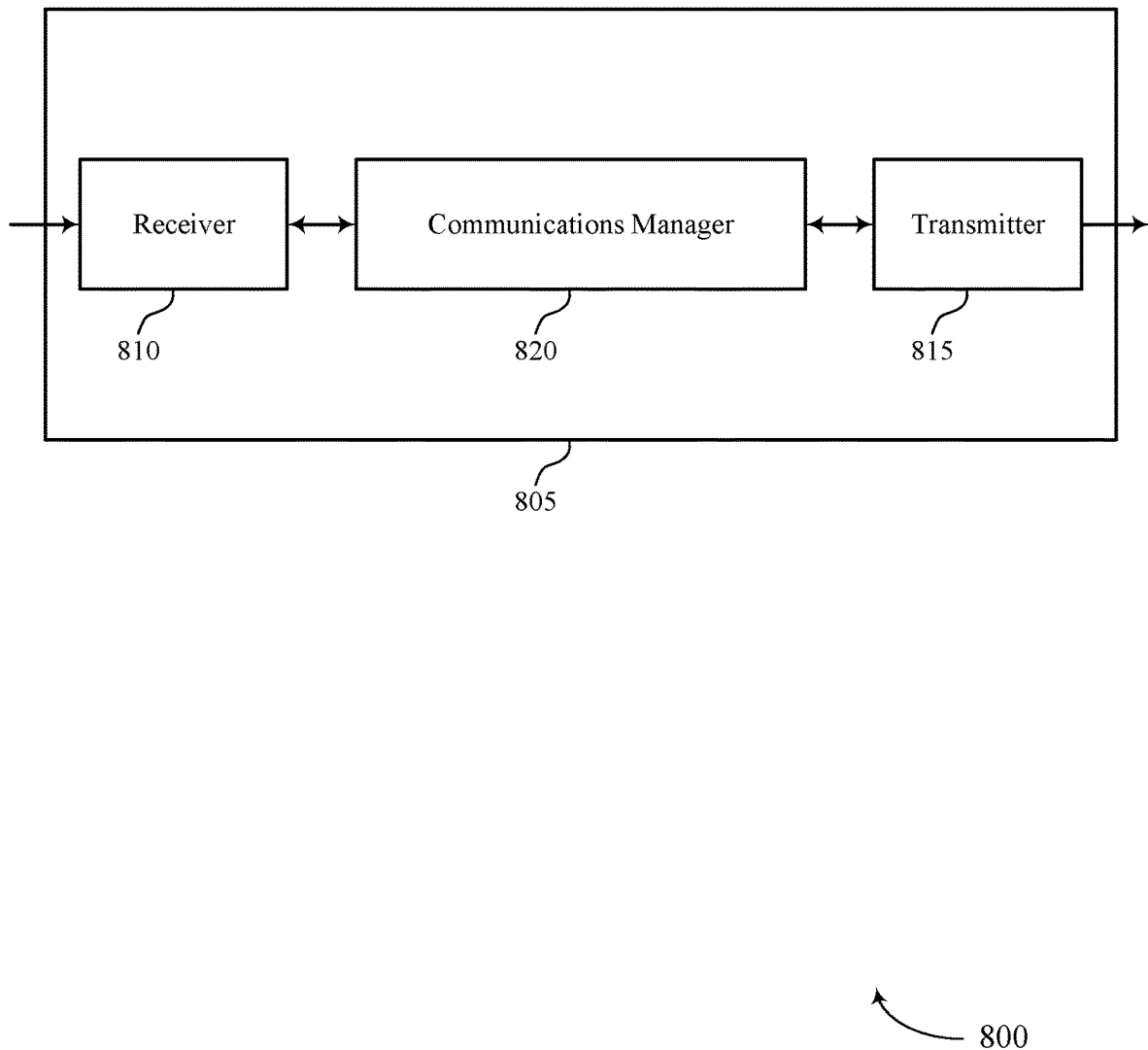
FIGS. 8 and 9 show block diagrams of devices that support enabling transitions between half-duplex and full-duplex modes in accordance with aspects of the present disclosure.

FIG. 8 shows a block diagram 800 of a device 805 that supports enabling transitions between half-duplex and full-duplex modes in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enabling transitions between half-duplex and full-duplex modes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enabling transitions between half-duplex and full-duplex modes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of enabling transitions between half-duplex and full-duplex modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, a first indication of a switching latency for transitioning between a half-duplex mode that supports half-duplex communication and a full-duplex mode that supports full-duplex communication. The communications manager 820 may be configured as or otherwise support a means for transmitting, to the UE in accordance with the first indication of the switching latency, a second indication that the UE is to transition to one of the half-duplex mode or the full-duplex mode. The communications manager 820 may be configured as or otherwise support a means for scheduling the UE for half-duplex communication or full-duplex communication based at least in part transmitting the second indication.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for, more efficient utilization of communication resources.

Figure 9:
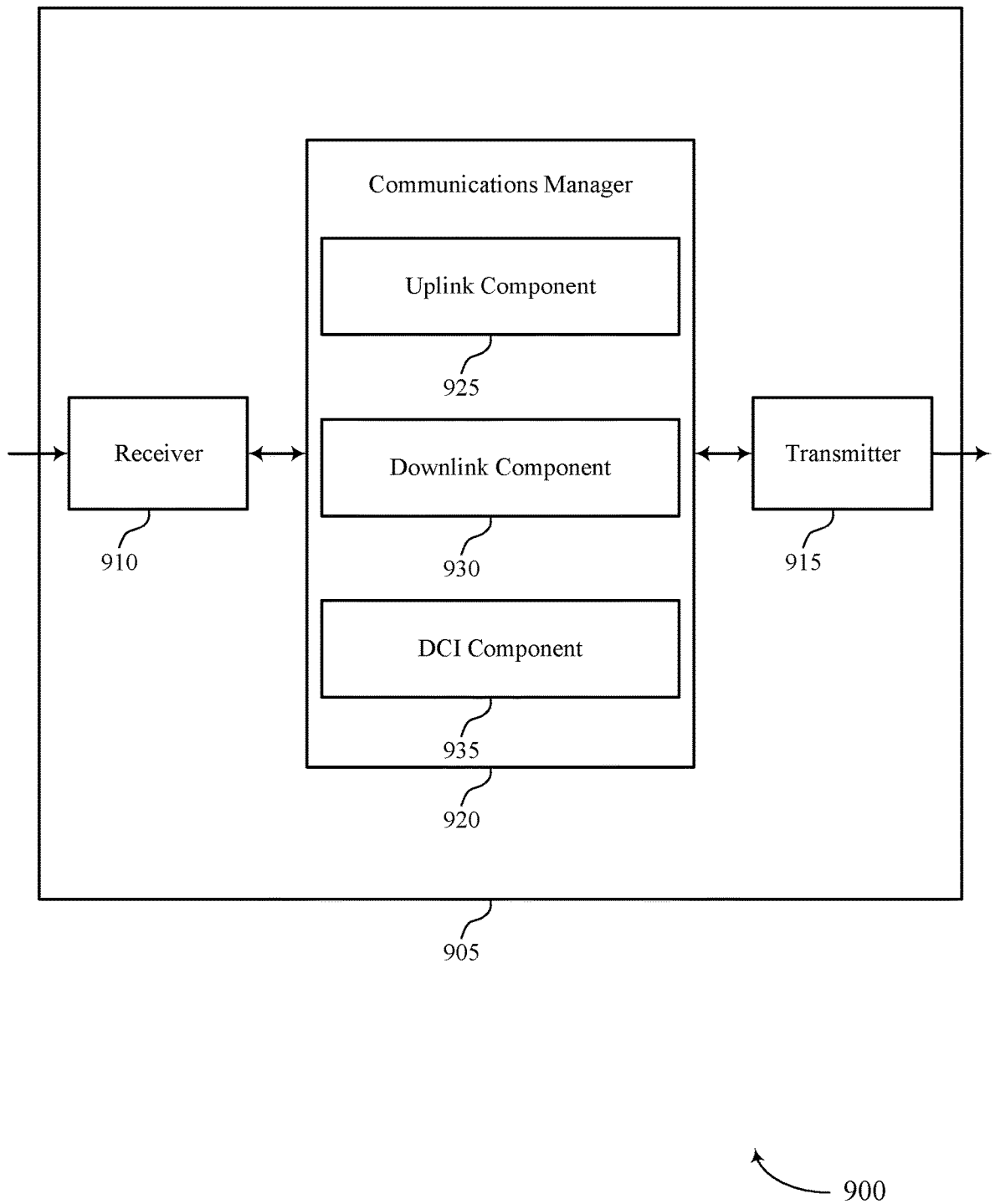

FIG. 9 shows a block diagram 900 of a device 905 that supports enabling transitions between half-duplex and full-duplex modes in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to enabling transitions between half-duplex and full-duplex modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to enabling transitions between half-duplex and full-duplex modes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of enabling transitions between half-duplex and full-duplex modes as described herein. For example, the communications manager 920 may include an uplink component 925, a downlink component 930, a DCI component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The uplink component 925 may be configured as or otherwise support a means for receiving, from a UE, a first indication of a switching latency for transitioning between a half-duplex mode that supports half-duplex communication and a full-duplex mode that supports full-duplex communication. The downlink component 930 may be configured as or otherwise support a means for transmitting, to the UE in accordance with the first indication of the switching latency, a second indication that the UE is to transition to one of the half-duplex mode or the full-duplex mode. The DCI component 935 may be configured as or otherwise support a means for scheduling the UE for half-duplex communication or full-duplex communication based at least in part transmitting the second indication.

Figure 10:
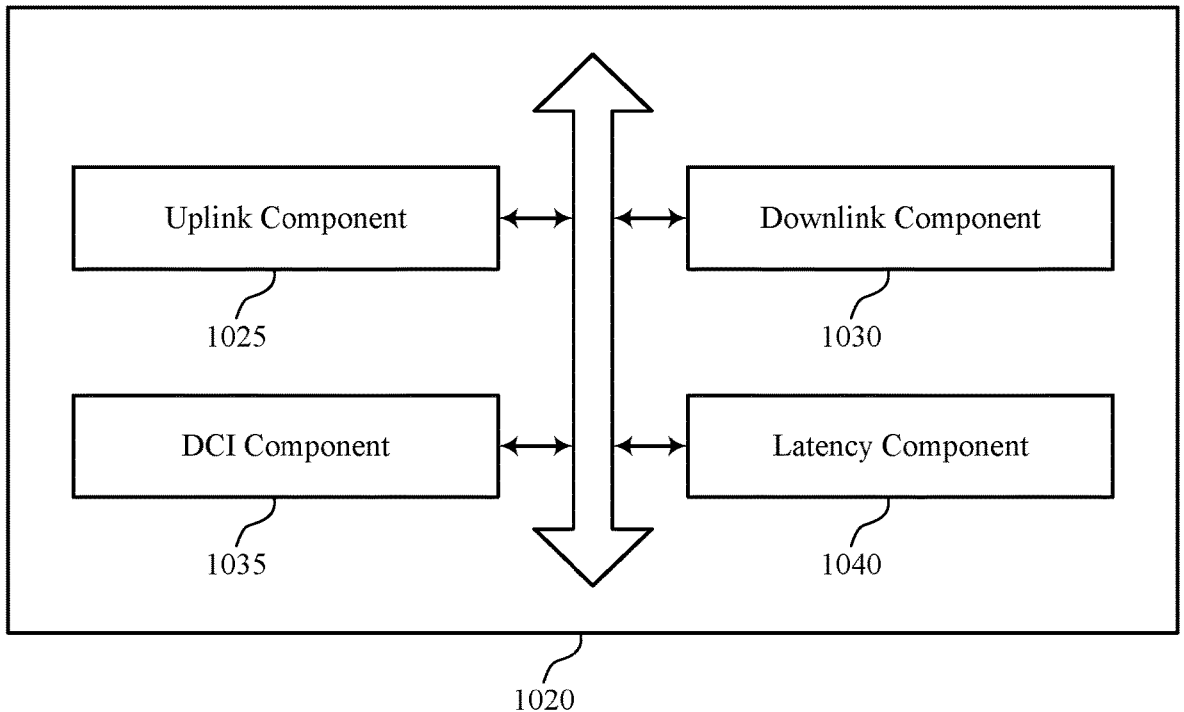
FIG. 10 shows a block diagram of a communications manager that supports enabling transitions between half-duplex and full-duplex modes in accordance with aspects of the present disclosure.

FIG. 10 shows a block diagram 1000 of a communications manager 1020 that supports enabling transitions between half-duplex and full-duplex modes in accordance with aspects of the present disclosure. The communications manager 1020 may be an example of aspects of a communications manager 820, a communications manager 920, or both, as described herein. The communications manager 1020, or various components thereof, may be an example of means for performing various aspects of enabling transitions between half-duplex and full-duplex modes as described herein. For example, the communications manager 1020 may include an uplink component 1025, a downlink component 1030, a DCI component 1035, a latency component 1040, or any combination thereof. Each of these components may communicate, directly or indirectly, with one another (e.g., via one or more buses).

The communications manager 1020 may support wireless communication at a base station in accordance with examples as disclosed herein. The uplink component 1025 may be configured as or otherwise support a means for receiving, from a UE, a first indication of a switching latency for transitioning between a half-duplex mode that supports half-duplex communication and a full-duplex mode that supports full-duplex communication. The downlink component 1030 may be configured as or otherwise support a means for transmitting, to the UE in accordance with the first indication of the switching latency, a second indication that the UE is to transition to one of the half-duplex mode or the full-duplex mode. The DCI component 1035 may be configured as or otherwise support a means for scheduling the UE for half-duplex communication or full-duplex communication based at least in part transmitting the second indication.

In some examples, the second indication activates an antenna panel at the UE for full duplex communication. In some examples, the second indication includes a second switching latency associated with switching from the half-duplex mode to the full-duplex mode.

In some examples, None, and the latency component 1040 may be configured as or otherwise support a means for determining the second switching latency based at least in part on a subcarrier spacing associated with the DCI, a subcarrier spacing associated with downlink transmissions for the full-duplex communication, a subcarrier associated with uplink transmissions for the full-duplex communication, or a combination thereof.

In some examples, the second switching latency includes an amount of time after which the base station is permitted to transmit downlink control information that schedules the UE for full-duplex communication, and the DCI component 1035 may be configured as or otherwise support a means for transmitting, after the amount of time has elapsed, the downlink control information that schedules the UE for full duplex communication.

In some examples, the amount of time is relative to receipt of the second indication at the UE, relative to transmission of an acknowledgment for the second indication by the UE, or relative to the end of a current scheduled transmission that includes the second indication.

In some examples, the second switching latency indicates an amount of time until the UE is scheduled for full-duplex communication, and the DCI component 1035 may be configured as or otherwise support a means for scheduling the UE for full-duplex communication after the amount of time has elapsed.

In some examples, the amount of time is relative to receipt of the second indication at the UE, relative to transmission of an acknowledgment for the second indication by the UE, or relative to the end of a current scheduled transmission that includes the second indication.

In some examples, the first indication of the switching latency includes a value for the switching latency. In some examples, the first indication of the switching latency includes one or more bits that indicate a range of values that includes a value of the switching latency.

In some examples, the latency component 1040 may be configured as or otherwise support a means for determining a default switching latency. In some examples, the downlink component 1030 may be configured as or otherwise support a means for transmitting an indication of the default switching latency to the UE.

In some examples, the switching latency is specific to an antenna array at the UE or specific to a pair of downlink and uplink full-duplex beams including a transmit beam and a receive beam.

In some examples, the switching latency is for transitioning from the half-duplex mode to the full-duplex mode, and the uplink component 1025 may be configured as or otherwise support a means for receiving, from the UE, a third indication of a second switching latency for transitioning from the full-duplex mode to the half-duplex mode.

Figure 11:
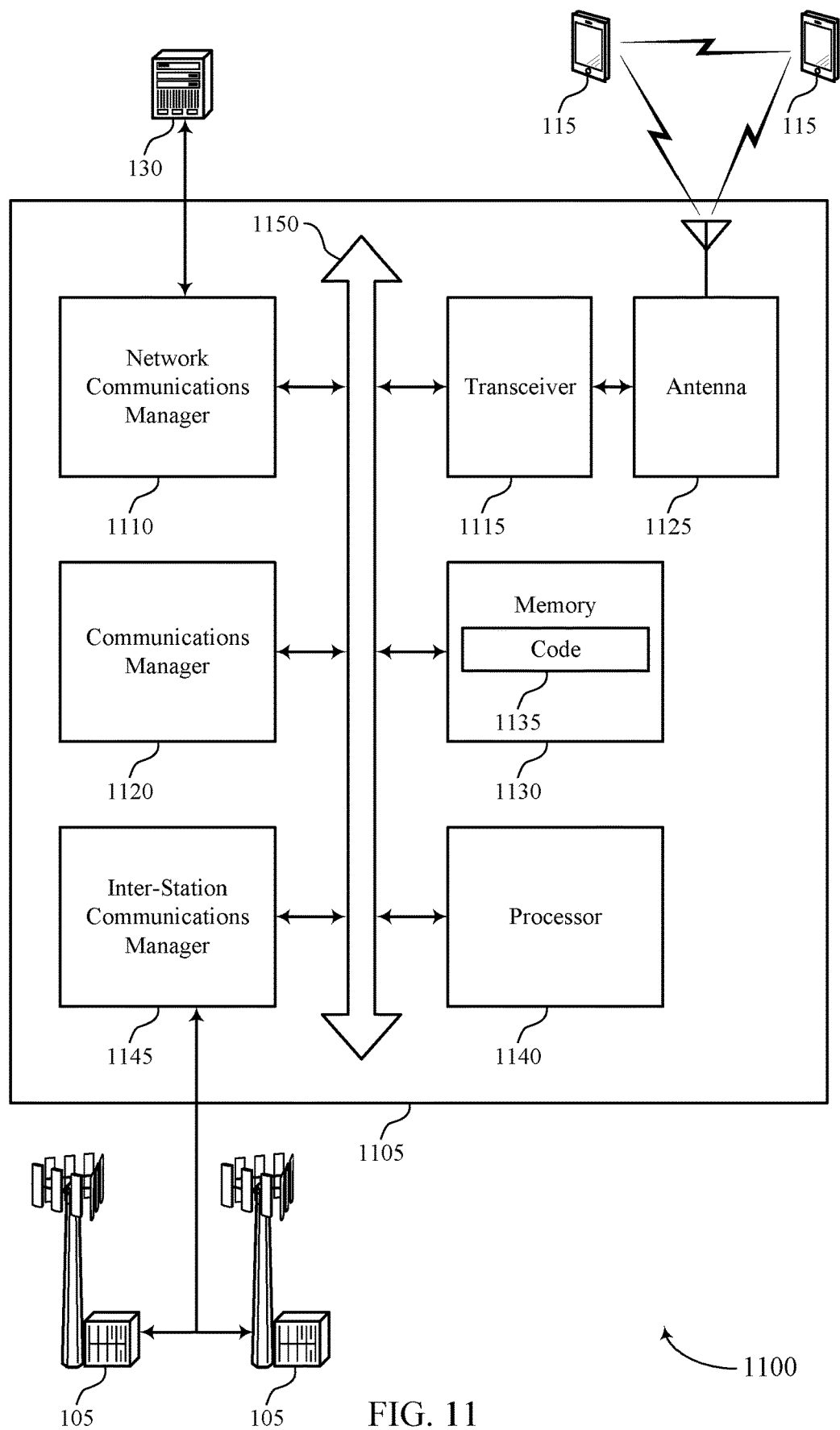
FIG. 11 shows a diagram of a system including a device that supports enabling transitions between half-duplex and full-duplex modes in accordance with aspects of the present disclosure.

FIG. 11 shows a diagram of a system 1100 including a device 1105 that supports enabling transitions between half-duplex and full-duplex modes in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting enabling transitions between half-duplex and full-duplex modes). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, a first indication of a switching latency for transitioning between a half-duplex mode that supports half-duplex communication and a full-duplex mode that supports full-duplex communication. The communications manager 1120 may be configured as or otherwise support a means for transmitting, to the UE in accordance with the first indication of the switching latency, a second indication that the UE is to transition to one of the half-duplex mode or the full-duplex mode. The communications manager 1120 may be configured as or otherwise support a means for scheduling the UE for half-duplex communication or full-duplex communication based at least in part transmitting the second indication.

By including or configuring the communications manager 1120 in accordance with examples as described herein, the device 1105 may support techniques for reduced latency and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of enabling transitions between half-duplex and full-duplex modes as described herein, or the processor 1140 and the memory 1130 may be otherwise configured to perform or support such operations.

Figure 12:
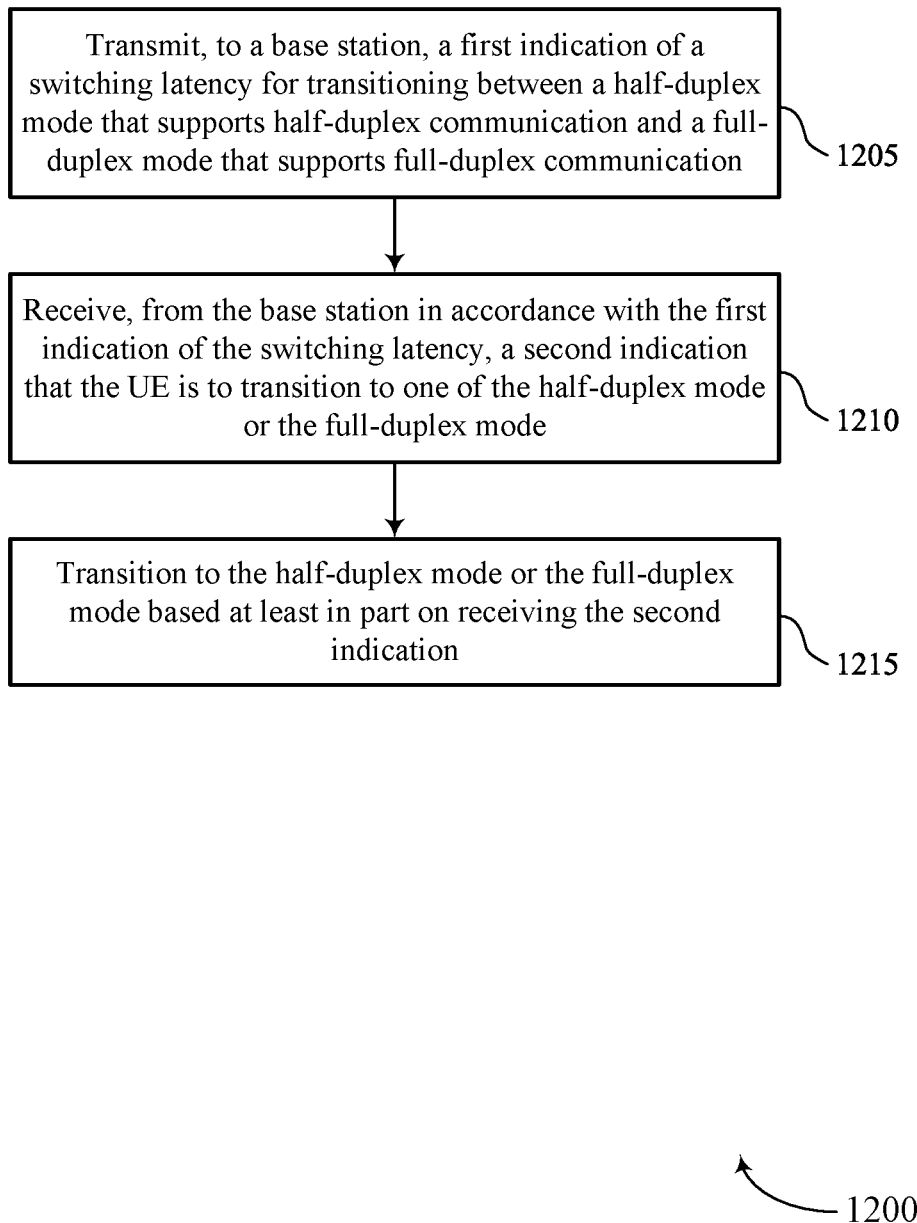
FIGS. 12 and 13 show flowcharts illustrating methods that support enabling transitions between half-duplex and full-duplex modes in accordance with aspects of the present disclosure.

FIG. 12 shows a flowchart illustrating a method 1200 that supports enabling transitions between half-duplex and full-duplex modes in accordance with aspects of the present disclosure. The operations of the method 1200 may be implemented by a UE or its components as described herein.

For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting, to a base station, a first indication of a switching latency for transitioning between a half-duplex mode that supports half-duplex communication and a full-duplex mode that supports full-duplex communication. The operations of 1205 may be performed in accordance with examples as disclosed herein. In some examples, aspects of the operations of 1205 may be performed by an uplink component 625 as described with reference to FIG. 6.

At 1210, the method may include receiving, from the base station in accordance with the first indication of the switching latency, a second indication that the UE is to transition to one of the half-duplex mode or the full-duplex mode. The operations of 1210 may be performed in accordance with examples as disclosed herein. In some examples, aspects of the operations of 1210 may be performed by a downlink component 630 as described with reference to FIG. 6.

At 1215, the method may include transitioning to the half-duplex mode or the full-duplex mode based at least in part on receiving the second indication. The operations of 1215 may be performed in accordance with examples as disclosed herein. In some examples, aspects of the operations of 1215 may be performed by a mode controller 635 as described with reference to FIG. 6.

Figure 13:
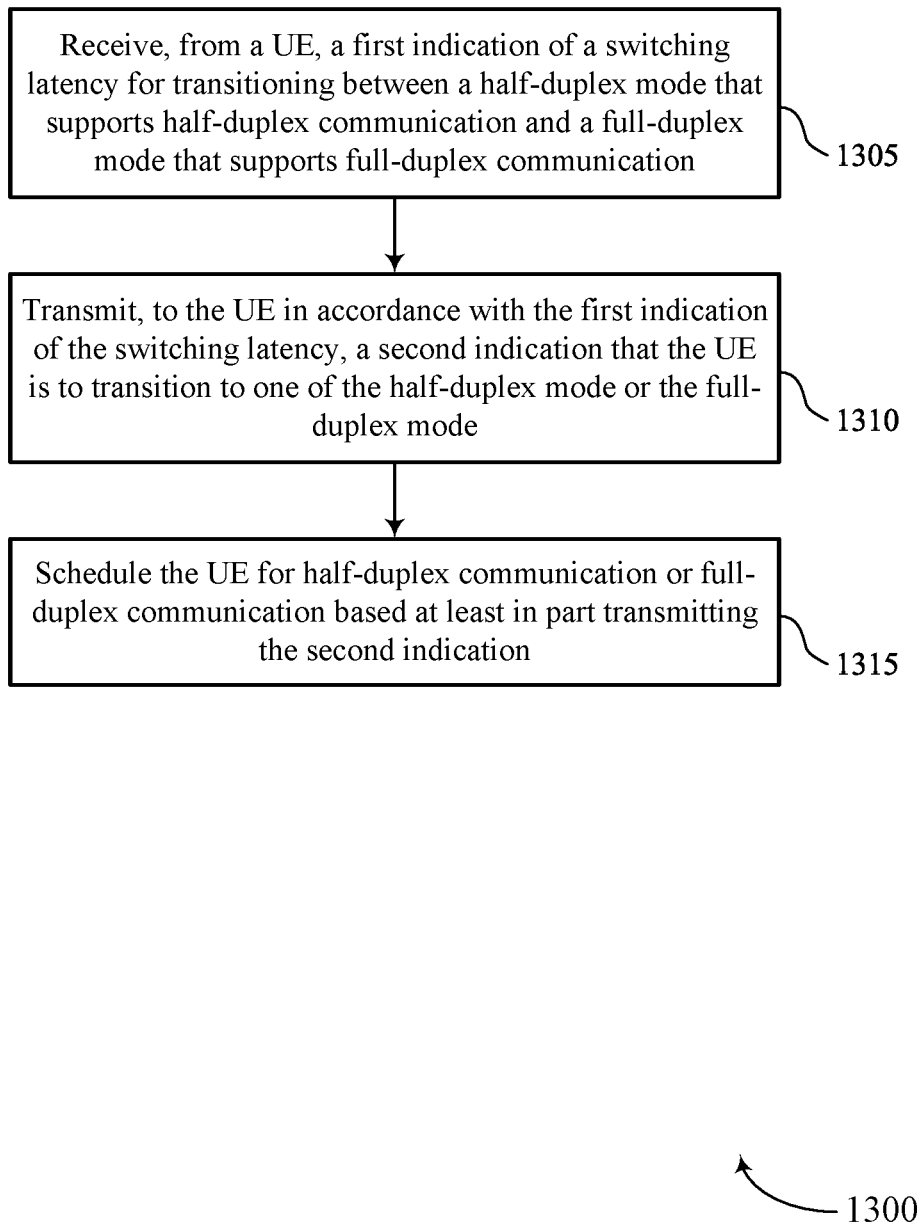

FIG. 13 shows a flowchart illustrating a method 1300 that supports enabling transitions between half-duplex and full-duplex modes in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1305, the method may include receiving, from a UE, a first indication of a switching latency for transitioning between a half-duplex mode that supports half-duplex communication and a full-duplex mode that supports full-duplex communication. The operations of 1305 may be performed in accordance with examples as disclosed herein. In some examples, aspects of the operations of 1305 may be performed by an uplink component 1025 as described with reference to FIG. 10.

At 1310, the method may include transmitting, to the UE in accordance with the first indication of the switching latency, a second indication that the UE is to transition to one of the half-duplex mode or the full-duplex mode. The operations of 1310 may be performed in accordance with examples as disclosed herein. In some examples, aspects of the operations of 1310 may be performed by a downlink component 1030 as described with reference to FIG. 10.

At 1315, the method may include scheduling the UE for half-duplex communication or full-duplex communication based at least in part transmitting the second indication. The operations of 1315 may be performed in accordance with examples as disclosed herein. In some examples, aspects of the operations of 1315 may be performed by a DCI component 1035 as described with reference to FIG. 10.

The following provides an overview of aspects of the present disclosure:

Aspect 1: A method for wireless communication at a UE, comprising: transmitting, to a base station, a first indication of a switching latency for transitioning between a half-duplex mode that supports half-duplex communication and a full-duplex mode that supports full-duplex communication; receiving, from the base station in accordance with the first indication of the switching latency, a second indication that the UE is to transition to one of the half-duplex mode or the full-duplex mode; and transitioning to the half-duplex mode or the full-duplex mode based at least in part on receiving the second indication.

Aspect 2: The method of aspect 1, wherein the second indication is included in downlink control information or a MAC-CE.

Aspect 3: The method of any of aspects 1 through 2, wherein a first antenna panel is activated at the UE for half-duplex communication, and the second indication activates a second antenna panel at the UE for full duplex communication.

Aspect 4: The method of any of aspects 1 through 3, wherein the second indication comprises scheduling information that schedules the UE for half-duplex communication or full-duplex communication.

Aspect 5: The method of any of aspects 1 through 4, wherein the second indication indicates a second switching latency associated with switching from the half-duplex mode to the full-duplex mode.

Aspect 6: The method of aspect 5, wherein the second switching latency comprises a minimum amount of time until the UE receives downlink control information that schedules the UE for full-duplex communication, the method further comprising: receiving the downlink control information that schedules the UE for full duplex communication, wherein the downlink control information is received after the minimum amount of time has elapsed.

Aspect 7: The method of any of aspects 5 through 6, wherein the second switching latency comprises an amount of time after which the base station is permitted to transmit downlink control information that schedules the UE for full-duplex communication, the method further comprising: receiving the downlink control information that schedules the UE for full duplex communication, wherein the downlink control information is received after the amount of time has elapsed.

Aspect 8: The method of aspect 7, wherein the amount of time is relative to receipt of the second indication, relative to transmission of an acknowledgment for the second indication, or relative to the end of a current scheduled transmission that includes the second indication.

Aspect 9: The method of aspect 5, wherein the second switching latency indicates an amount of time until the UE is scheduled for full-duplex communication, the method further comprising: determining that the UE is scheduled for full-duplex communication after the amount of time has elapsed.

Aspect 10: The method of aspect 9, wherein the amount of time is relative to receipt of the second indication, relative to transmission of an acknowledgment for the second indication, or relative to the end of a current scheduled transmission that includes the second indication.

Aspect 11: The method of any of aspects 1 through 10, wherein the first indication of the switching latency comprises a value for the switching latency.

Aspect 12: The method of any of aspects 1 through 10, wherein the first indication of the switching latency comprises one or more bits that indicate a range of values that includes a value of the switching latency.

Aspect 13: The method of any of aspects 1 through 12, further comprising: determining a respective switching latency for pairs of beams that support full-duplex communication, wherein the first indication of the switching latency comprises a maximum latency determined for the pairs of beams.

Aspect 14: The method of any of aspects 1 through 13, further comprising: determining a default switching latency; and determining that the switching latency is different than the default switching latency, wherein the switching latency is indicated to the base station based at least in part on the determination.

Aspect 15: The method of any of aspects 1 through 14, wherein the switching latency is specific to an antenna array at the UE or specific to a pair of downlink and uplink full-duplex beams comprising a transmit beam and a receive beam.

Aspect 16: The method of any of aspects 1 through 15, further comprising: determining the switching latency based at least in part on whether the UE is transmitting or receiving in the half-duplex mode.

Aspect 17: The method of any of aspects 1 through 16, wherein the switching latency is for transitioning from the half-duplex mode to the full-duplex mode, the method further comprising: transmitting, to the base station, a third indication of a second switching latency for transitioning from the full-duplex mode to the half-duplex mode.

Aspect 18: The method of any of aspects 1 through 17, wherein the first indication is included in a report, the method further comprising: including in the report a minimum timing advance for the UE to support full-duplex communication, a maximum transmit power for the UE to support full-duplex communication, a minimum SCS guard band for the UE to support full-duplex communication, or a combination thereof.

Aspect 19: A method for wireless communication at a base station, comprising: receiving, from a UE, a first indication of a switching latency for transitioning between a half-duplex mode that supports half-duplex communication and a full-duplex mode that supports full-duplex communication; transmitting, to the UE in accordance with the first indication of the switching latency, a second indication that the UE is to transition to one of the half-duplex mode or the full-duplex mode; and scheduling the UE for half-duplex communication or full-duplex communication based at least in part transmitting the second indication.

Aspect 20: The method of aspect 19, wherein the second indication activates an antenna panel at the UE for full duplex communication.

Aspect 21: The method of any of aspects 19 through 20, wherein the second indication comprises a second switching latency associated with switching from the half-duplex mode to the full-duplex mode.

Aspect 22: The method of aspect 21, wherein DCI schedules the UE for full-duplex communication, the method further comprising: determining the second switching latency based at least in part on a subcarrier spacing associated with the DCI, a subcarrier spacing associated with downlink transmissions for the full-duplex communication, a subcarrier associated with uplink transmissions for the full-duplex communication, or a combination thereof.

Aspect 23: The method of any of aspects 21 through 22, wherein the second switching latency comprises an amount of time after which the base station is permitted to transmit downlink control information that schedules the UE for full-duplex communication, the method further comprising: transmitting, after the amount of time has elapsed, the downlink control information that schedules the UE for full duplex communication.

Aspect 24: The method of aspect 23, wherein the amount of time is relative to receipt of the second indication at the UE, relative to transmission of an acknowledgment for the second indication by the UE, or relative to the end of a current scheduled transmission that includes the second indication.

Aspect 25: The method of any of aspects 21 through 22, wherein the second switching latency indicates an amount of time until the UE is scheduled for full-duplex communication, the method further comprising: scheduling the UE for full-duplex communication after the amount of time has elapsed.

Aspect 26: The method of aspect 25, wherein the amount of time is relative to receipt of the second indication at the UE, relative to transmission of an acknowledgment for the second indication by the UE, or relative to the end of a current scheduled transmission that includes the second indication.

Aspect 27: The method of any of aspects 19 through 26, wherein the first indication of the switching latency comprises a value for the switching latency.

Aspect 28: The method of any of aspects 19 through 26, wherein the first indication of the switching latency comprises one or more bits that indicate a range of values that includes a value of the switching latency.

Aspect 29: The method of any of aspects 19 through 28, further comprising: determining a default switching latency; and transmitting an indication of the default switching latency to the UE.

Aspect 30: The method of any of aspects 19 through 29, wherein the switching latency is specific to an antenna array at the UE or specific to a pair of downlink and uplink full-duplex beams comprising a transmit beam and a receive beam.

Aspect 31: The method of any of aspects 19 through 30, wherein the switching latency is for transitioning from the half-duplex mode to the full-duplex mode, the method further comprising: receiving, from the UE, a third indication of a second switching latency for transitioning from the full-duplex mode to the half-duplex mode.

Aspect 32: An apparatus for wireless communication at a UE, comprising a processor; and a memory coupled with the processor, wherein the memory comprises instructions executable by the processor to cause the apparatus to perform a method of any of aspects 1 through 18.

Aspect 33: An apparatus for wireless communication at a UE, comprising at least one means for performing a method of any of aspects 1 through 18.

Aspect 34: A non-transitory computer-readable medium storing code for wireless communication at a UE, the code comprising instructions executable by a processor to perform a method of any of aspects 1 through 18.

Aspect 35: An apparatus for wireless communication at a base station, comprising a processor; and a memory coupled with the processor, wherein the memory comprises instructions executable by the processor to cause the apparatus to perform a method of any of aspects 19 through 31.

Aspect 36: An apparatus for wireless communication at a base station, comprising at least one means for performing a method of any of aspects 19 through 31.

Aspect 37: A non-transitory computer-readable medium storing code for wireless communication at a base station, the code comprising instructions executable by a processor to perform a method of any of aspects 19 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a processor; and
a memory coupled with the processor, wherein the memory comprises instructions executable by the processor to cause the apparatus to:
transmit, to a base station, a first indication of a switching latency for transitioning between a half-duplex mode that supports half-duplex communication and a full-duplex mode that supports full-duplex communication, wherein the first indication of the switching latency comprises a maximum latency associated with a plurality of pairs of beams, associated with the apparatus, that support full-duplex communication;
receive, from the base station in accordance with the first indication of the switching latency, a second indication that the apparatus is to transition to one of the half-duplex mode or the full-duplex mode; and
transition to the half-duplex mode or the full-duplex mode based at least in part on receiving the second indication.

2. The apparatus of claim 1, wherein a first antenna panel is activated at the apparatus for half-duplex communication, and the second indication activates a second antenna panel at the apparatus for full duplex communication.

3. The apparatus of claim 1, wherein the second indication comprises scheduling information that schedules the apparatus for half-duplex communication or full-duplex communication.

4. The apparatus of claim 1, wherein the second indication indicates a second switching latency associated with switching from the half-duplex mode to the full-duplex mode.

5. The apparatus of claim 4, wherein the second switching latency comprises an amount of time after which the base station is permitted to transmit downlink control information that schedules the apparatus for full-duplex communication, and wherein the instructions are further executable by the processor to cause the apparatus to:
receive the downlink control information that schedules the apparatus for full duplex communication, wherein the downlink control information is received after the amount of time has elapsed.

6. The apparatus of claim 5, wherein the amount of time is relative to receipt of the second indication, relative to transmission of an acknowledgment for the second indication, or relative to the end of a current scheduled transmission that includes the second indication.

7. The apparatus of claim 4, wherein the second switching latency indicates an amount of time until the apparatus is scheduled for full-duplex communication, and wherein the instructions are further executable by the processor to cause the apparatus to:
determine that the apparatus is scheduled for full-duplex communication after the amount of time has elapsed.

8. The apparatus of claim 7, wherein the amount of time is relative to receipt of the second indication, relative to transmission of an acknowledgment for the second indication, or relative to the end of a current scheduled transmission that includes the second indication.

9. The apparatus of claim 1, wherein the first indication of the switching latency comprises a value for the switching latency.

10. The apparatus of claim 1, wherein the first indication of the switching latency comprises one or more bits that indicate a range of values that includes a value of the switching latency.

11. The apparatus of claim 1, wherein the instructions are further executable by the processor to cause the apparatus to:
determine a respective switching latency for the pairs of beams that support full-duplex communication.

12. The apparatus of claim 1, wherein the instructions are further executable by the processor to cause the apparatus to:
determine a default switching latency; and
determine that the switching latency is different than the default switching latency, wherein the switching latency is indicated to the base station based at least in part on the determination.

13. The apparatus of claim 1, wherein the switching latency is specific to an antenna array at the apparatus or specific to a pair of downlink and uplink full-duplex beams comprising a transmit beam and a receive beam.

14. The apparatus of claim 1, wherein the first indication is included in a report, and wherein the instructions are further executable by the processor to cause the apparatus to:
include in the report a minimum timing advance for the apparatus to support full-duplex communication, a maximum transmit power for the apparatus to support full-duplex communication, a minimum subcarrier spacing (SCS) guard band for the apparatus to support full-duplex communication, or a combination thereof.

15. A method for wireless communication at a user equipment (UE), comprising:
transmitting, to a base station, a first indication of a switching latency for transitioning between a half-duplex mode that supports half-duplex communication and a full-duplex mode that supports full-duplex communication, wherein the first indication of the switching latency comprises a maximum latency associated with a plurality of pairs of beams, associated with the UE, that support full-duplex communication;
receiving, from the base station in accordance with the first indication of the switching latency, a second indication that the UE is to transition to one of the half-duplex mode or the full-duplex mode; and
transitioning to the half-duplex mode or the full-duplex mode based at least in part on receiving the second indication.

16. The method of claim 15, wherein a first antenna panel is activated at the UE for half-duplex communication, and the second indication activates a second antenna panel at the UE for full duplex communication.

17. The method of claim 15, wherein the second indication comprises scheduling information that schedules the UE for half-duplex communication or full-duplex communication.

18. The method of claim 15, wherein the second indication indicates a second switching latency associated with switching from the half-duplex mode to the full-duplex mode.

19. The method of claim 18, wherein the second switching latency comprises an amount of time after which the base station is permitted to transmit downlink control information that schedules the UE for full-duplex communication, the method further comprising:

receiving the downlink control information that schedules the UE for full duplex communication, wherein the downlink control information is received after the amount of time has elapsed.

20. The method of claim 19, wherein the amount of time is relative to receipt of the second indication, relative to transmission of an acknowledgment for the second indication, or relative to the end of a current scheduled transmission that includes the second indication.

21. The method of claim 18, wherein the second switching latency indicates an amount of time until the UE is scheduled for full-duplex communication, the method further comprising:
determining that the UE is scheduled for full-duplex communication after the amount of time has elapsed.

22. The method of claim 21, wherein the amount of time is relative to receipt of the second indication, relative to transmission of an acknowledgment for the second indication, or relative to the end of a current scheduled transmission that includes the second indication.

23. The method of claim 15, further comprising:
determining a respective switching latency for the pairs of beams that support full-duplex communication.

24. The method of claim 15, further comprising:
determining a default switching latency; and
determining that the switching latency is different than the default switching latency, wherein the switching latency is indicated to the base station based at least in part on the determination.

25. An apparatus, comprising:
a processor; and
a memory coupled with the processor, wherein the memory comprises instructions executable by the processor to cause the apparatus to:
receive, from a user equipment (UE), a first indication of a switching latency for transitioning between a half-duplex mode that supports half-duplex communication and a full-duplex mode that supports full-duplex communication, wherein the first indication of the switching latency comprises a maximum latency associated with a plurality of pairs of beams, associated with the UE, that support full-duplex communication;
transmit, to the UE in accordance with the first indication of the switching latency, a second indication that the UE is to transition to one of the half-duplex mode or the full-duplex mode; and
schedule the UE for half-duplex communication or full-duplex communication based at least in part transmitting the second indication.

26. The apparatus of claim 25, wherein the second indication comprises a second switching latency associated with switching from the half-duplex mode to the full-duplex mode.

27. The apparatus of claim 26, wherein downlink control information (DCI) schedules the UE for full-duplex communication, and wherein the instructions are further executable by the processor to cause the apparatus to:
determine the second switching latency based at least in part on a subcarrier spacing associated with the DCI, a subcarrier spacing associated with downlink transmissions for the full-duplex communication, a subcarrier associated with uplink transmissions for the full-duplex communication, or a combination thereof.

28. A method for wireless communication at a base station, comprising:
receiving, from a user equipment (UE), a first indication of a switching latency for transitioning between a half-duplex mode that supports half-duplex communication and a full-duplex mode that supports full-duplex communication, wherein the first indication of the switching latency comprises a maximum latency associated with a plurality of pairs of beams, associated with the UE, that support full-duplex communication;
transmitting, to the UE in accordance with the first indication of the switching latency, a second indication that the UE is to transition to one of the half-duplex mode or the full-duplex mode; and
scheduling the UE for half-duplex communication or full-duplex communication based at least in part transmitting the second indication.

29. The method of claim 28, wherein the second indication comprises a second switching latency associated with switching from the half-duplex mode to the full-duplex mode.

30. The method of claim 29, wherein downlink control information (DCI) schedules the UE for full-duplex communication, the method further comprising:
determining the second switching latency based at least in part on a subcarrier spacing associated with the DCI, a subcarrier spacing associated with downlink transmissions for the full-duplex communication, a subcarrier associated with uplink transmissions for the full-duplex communication, or a combination thereof.

* * * * *